US009651021B2

(12) United States Patent
Neumann et al.

(10) Patent No.: US 9,651,021 B2
(45) Date of Patent: May 16, 2017

(54) SYSTEM AND METHOD FOR REMOVING AND/OR INSTALLING A ROTOR BLADE OF A WIND TURBINE

(71) Applicant: General Electric Company, Schenectady, NY (US)

(72) Inventors: Ulrich Werner Neumann, Simpsonville, SC (US); Brent Hamilton Holloway, Simpsonville, SC (US); Gaylon Mitchell Pfeiffer, Tampa, FL (US); Michael R. Johnson, Campton, NH (US); Forrest Christopher Hach, Lake Benton, MN (US); Kevin Costain, Baltic, SD (US); Stephanie Willman, Greenville, SC (US)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 14/480,656

(22) Filed: Sep. 9, 2014

(65) Prior Publication Data
US 2016/0069321 A1    Mar. 10, 2016

(51) Int. Cl.
*B23P 19/04* (2006.01)
*F03D 1/06* (2006.01)
(Continued)

(52) U.S. Cl.
CPC .............. *F03D 1/005* (2013.01); *B23P 6/002* (2013.01); *B23P 19/04* (2013.01); *B66D 1/60* (2013.01);
(Continued)

(58) Field of Classification Search
CPC .......... F03D 1/001; F03D 1/003; F03D 1/005; F03D 1/0658; F05B 2240/916;
(Continued)

(56) References Cited

U.S. PATENT DOCUMENTS 4,474,263 A * 10/1984 Christopher .............. B66B 9/00
182/10
7,353,603 B2    4/2008 Wobben
(Continued)

FOREIGN PATENT DOCUMENTS

CA    2692705    8/2010
EP    2345811 B1    10/2012
(Continued)

OTHER PUBLICATIONS

Related U.S. Appl. No. 14/257,538, filed Apr. 21, 2014.

*Primary Examiner* — Christopher Besler
*Assistant Examiner* — Matthew P Travers
(74) *Attorney, Agent, or Firm* — Dority & Manning, P.A.

(57) ABSTRACT

The present disclosure is directed to a system and method for lifting and/or removing a rotor blade to and from a wind turbine. In one embodiment, the system includes an up-tower pulley mounted on an up-tower location of the wind turbine, first and second ground winches, a pulley cable from the first ground winch over the up-tower pulley and attached to the rotor blade, a guide line attached between an up-tower location of the wind turbine and the second ground winch, a guide pulley mounted on the guide line, and a guide cable from the guide line over the guide pulley to the rotor blade. Thus, the guide pulley is configured to move along the guide line during lifting and removing of the rotor blade so that the guide cable can control an orientation of the rotor blade relative to the tower during lifting and removing of the rotor blade.

18 Claims, 26 Drawing Sheets

(51) Int. Cl.
  *F03D 1/00* (2006.01)
  *B66D 1/60* (2006.01)
  *B23P 6/00* (2006.01)

(52) U.S. Cl.
  CPC ............. *F03D 1/001* (2013.01); *F03D 1/003* (2013.01); *F03D 1/0658* (2013.01); *F05B 2230/61* (2013.01); *F05B 2230/70* (2013.01); *F05B 2230/80* (2013.01); *F05B 2240/916* (2013.01); *Y02E 10/721* (2013.01); *Y02E 10/728* (2013.01); *Y02P 70/523* (2015.11); *Y10T 29/49318* (2015.01); *Y10T 29/49721* (2015.01); *Y10T 29/53983* (2015.01)

(58) Field of Classification Search
  CPC .............. F05B 2230/61; F05B 2230/70; F05B 2230/80; B23P 6/00; B23P 6/002; B23P 19/04; B66D 1/60; B66F 11/00; Y10T 29/49318; Y10T 29/49721; Y10T 29/49815; Y10T 29/49826; Y10T 29/53; Y10T 29/53983
  See application file for complete search history.

(56) References Cited

U.S. PATENT DOCUMENTS

| | | |
|---|---|---|
| 7,735,290 B2 | 6/2010 | Arsene |
| 7,785,073 B2 | 8/2010 | Wobben |
| 7,832,101 B2 | 11/2010 | Koesters |
| 7,877,934 B2 | 2/2011 | Livingston et al. |
| 8,033,791 B1 | 10/2011 | Watanabe |
| 8,052,396 B2 | 11/2011 | Wobben |
| 8,069,634 B2 | 12/2011 | Livingston et al. |
| 8,083,212 B2 | 12/2011 | Numajiri et al. |
| 8,118,552 B2 | 2/2012 | Nies |
| 8,191,253 B2 | 6/2012 | Vangsy |
| 8,240,962 B2 | 8/2012 | Livingston et al. |
| 8,360,398 B2 | 1/2013 | Diaz De Corcuera et al. |
| 8,528,735 B2 | 9/2013 | Nies |
| 8,562,302 B2 | 10/2013 | Bakhuis et al. |
| 8,584,355 B2 | 11/2013 | Holling |
| 8,595,931 B2 | 12/2013 | Riddell et al. |
| 8,602,700 B2 | 12/2013 | Johnson |
| 8,651,462 B2 | 2/2014 | Van Berlo et al. |
| 2007/0266538 A1 | 11/2007 | Bervang |
| 2007/0290426 A1 | 12/2007 | Trede et al. |
| 2009/0167023 A1 | 7/2009 | Nies |
| 2010/0018055 A1 | 1/2010 | Lynderup et al. |
| 2010/0028152 A1 | 2/2010 | Numajiri et al. |
| 2010/0139062 A1 | 6/2010 | Reed et al. |
| 2010/0254813 A1 | 10/2010 | Dawson et al. |
| 2011/0142636 A1 | 6/2011 | Curtin |
| 2012/0027561 A1 | 2/2012 | Riddell et al. |
| 2012/0076663 A1 | 3/2012 | From |
| 2012/0137481 A1 | 6/2012 | Lindberg et al. |
| 2012/0217089 A1 | 8/2012 | Fenger |
| 2013/0025113 A1 | 1/2013 | Arocena De La Rua et al. |
| 2013/0074335 A1 | 3/2013 | Amano |
| 2013/0236316 A1 | 9/2013 | Bitsch et al. |
| 2013/0236324 A1 | 9/2013 | Bech et al. |
| 2013/0318789 A1 | 12/2013 | Gabeiras et al. |
| 2014/0010658 A1 | 1/2014 | Nielsen |

FOREIGN PATENT DOCUMENTS

| | | |
|---|---|---|
| EP | 2369174 B1 | 11/2012 |
| EP | 2616670 A1 | 7/2013 |
| JP | 2006152862 A | 6/2006 |
| WO | WO 2010/147480 A1 | 12/2010 |
| WO | WO 2011/064659 A2 | 6/2011 |
| WO | WO 2011/095167 A2 | 8/2011 |
| WO | WO 2012/065613 A1 | 5/2012 |

* cited by examiner

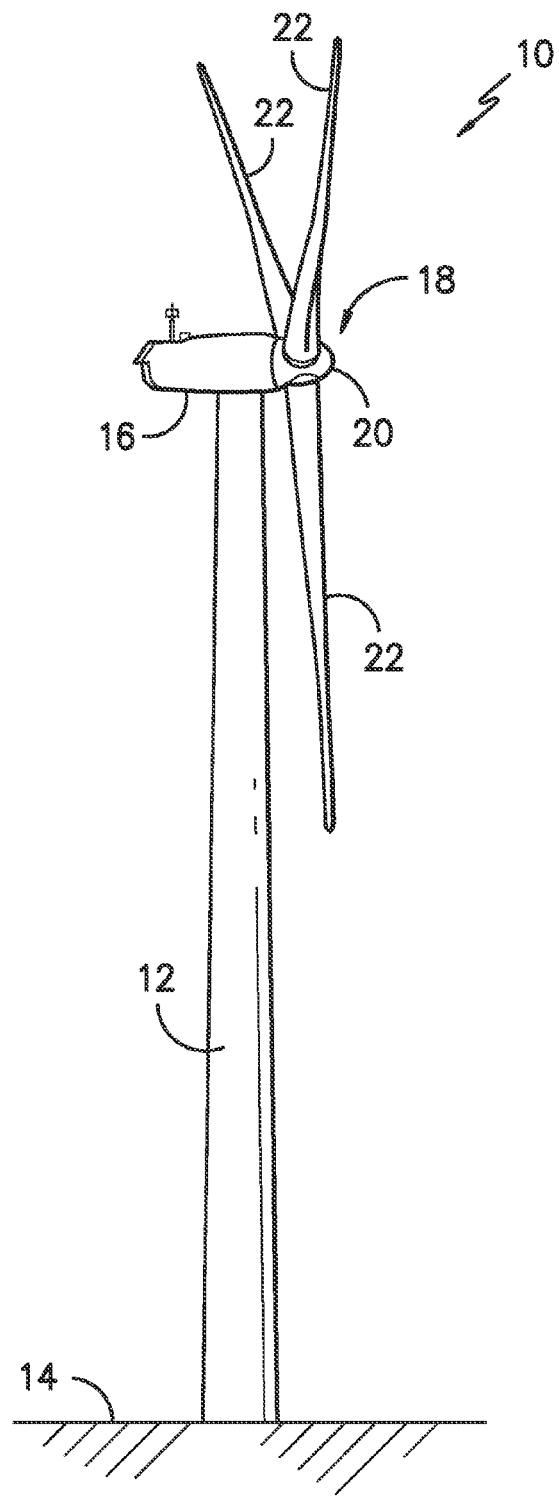
FIG. -1-

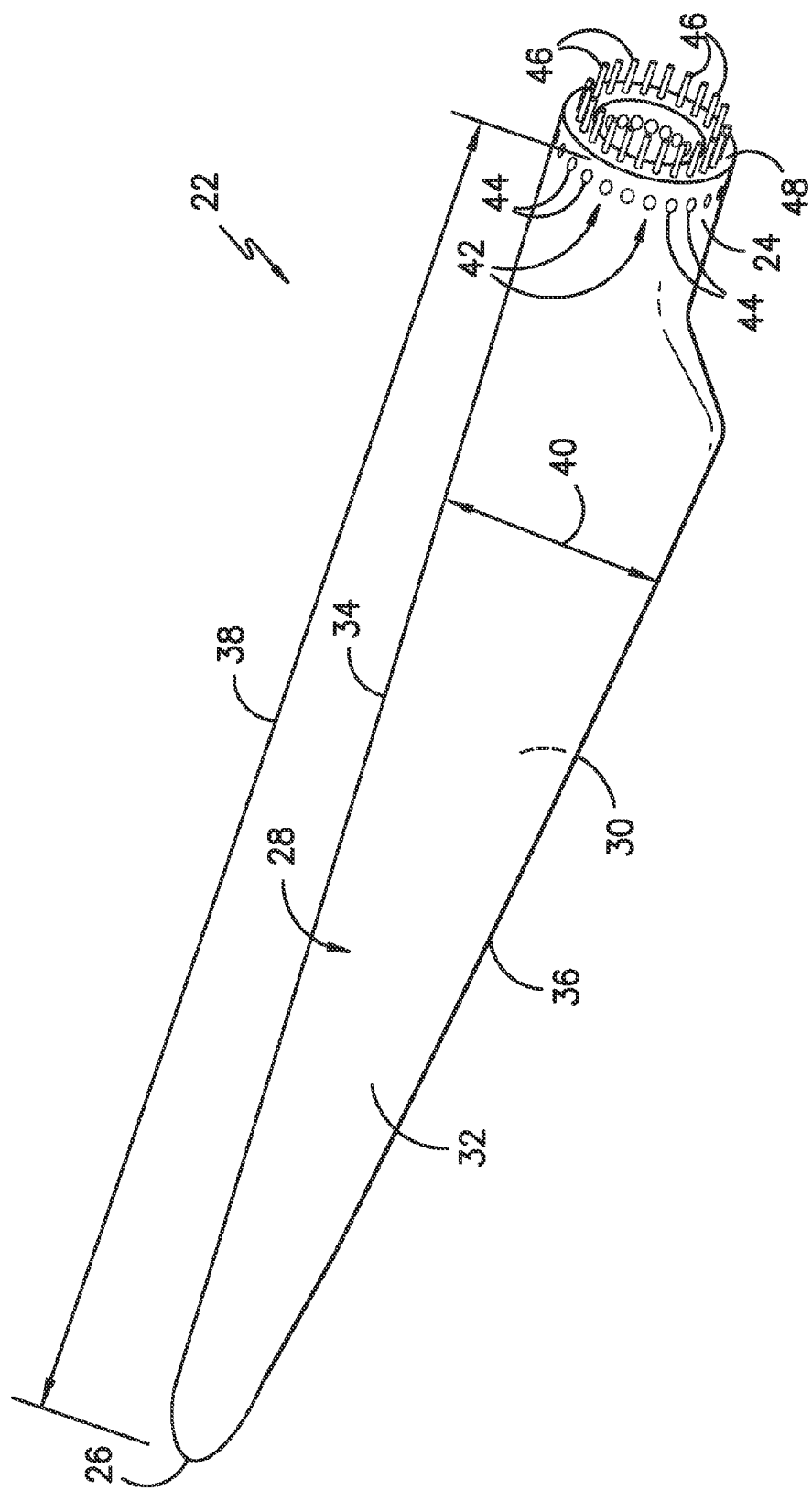
FIG. -2-

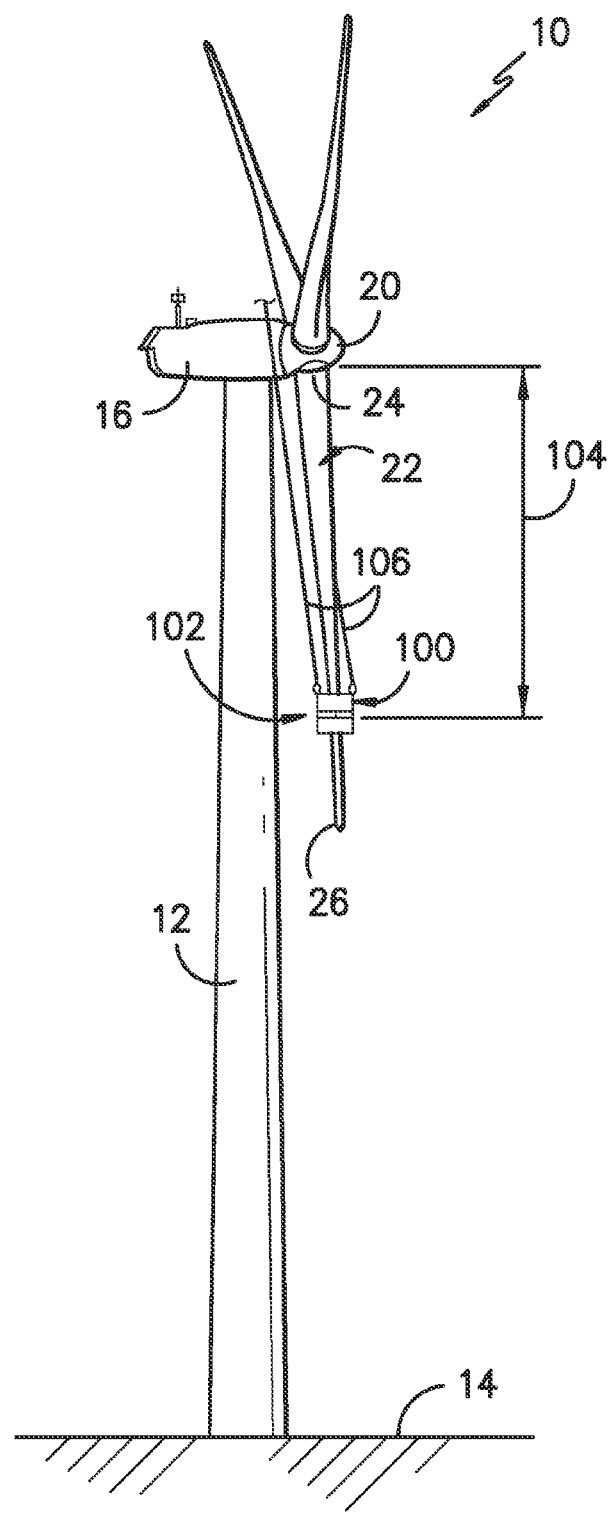
FIG. -3-

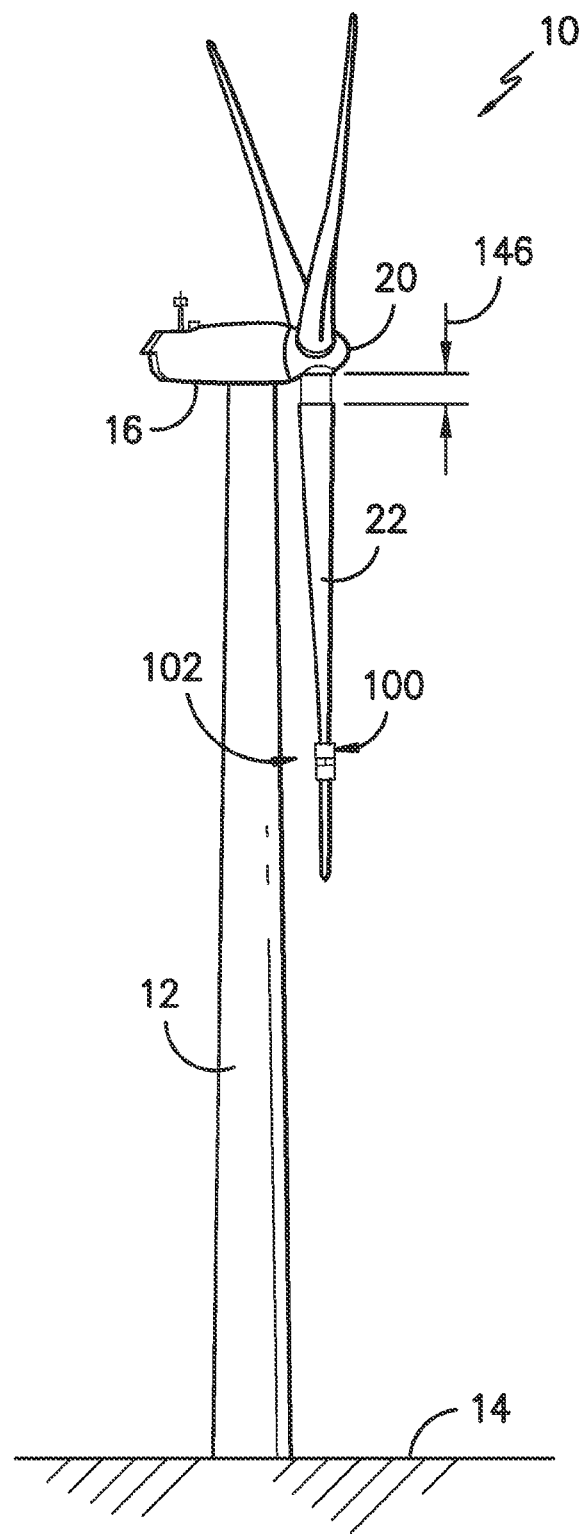
FIG. -4-

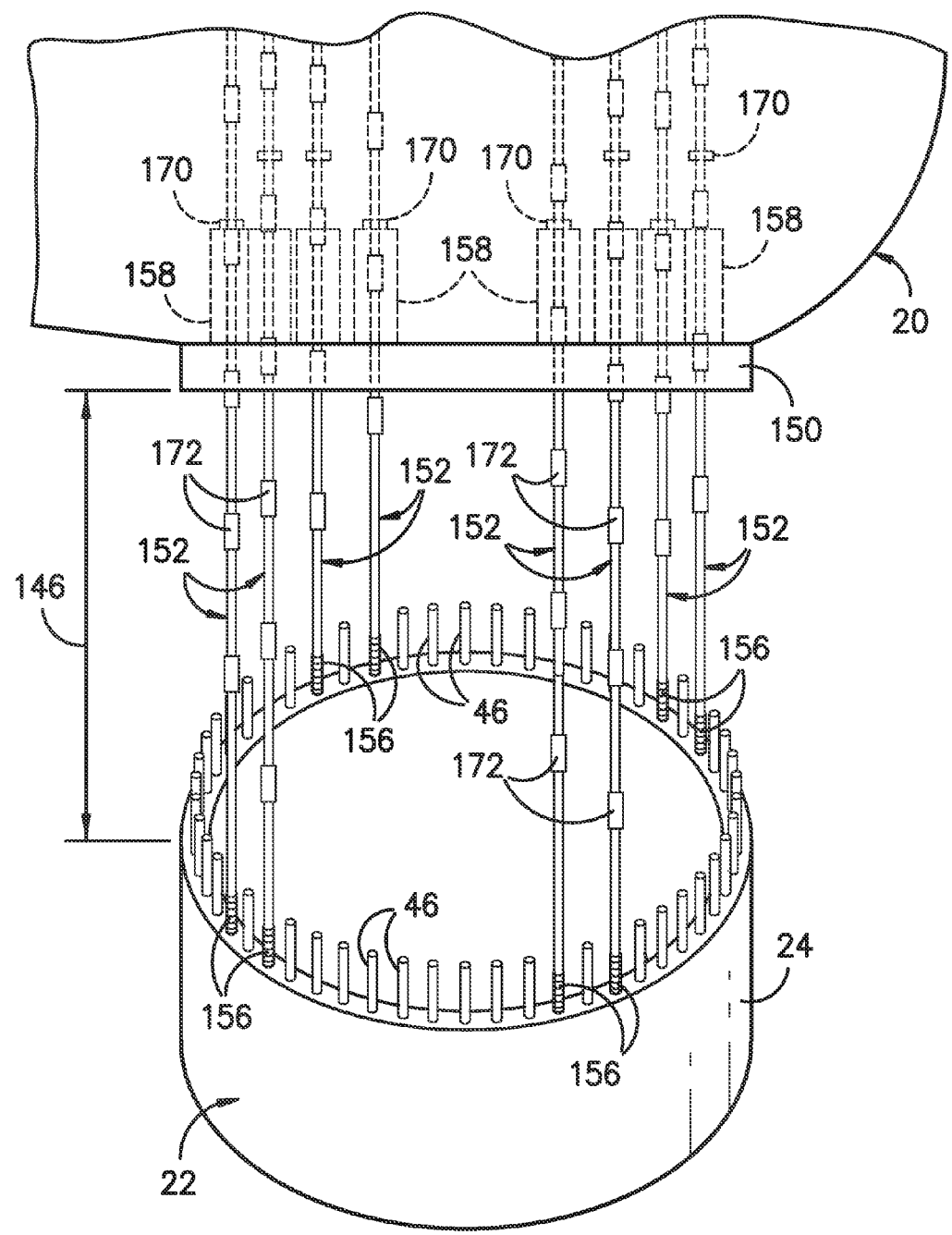
FIG. -5-

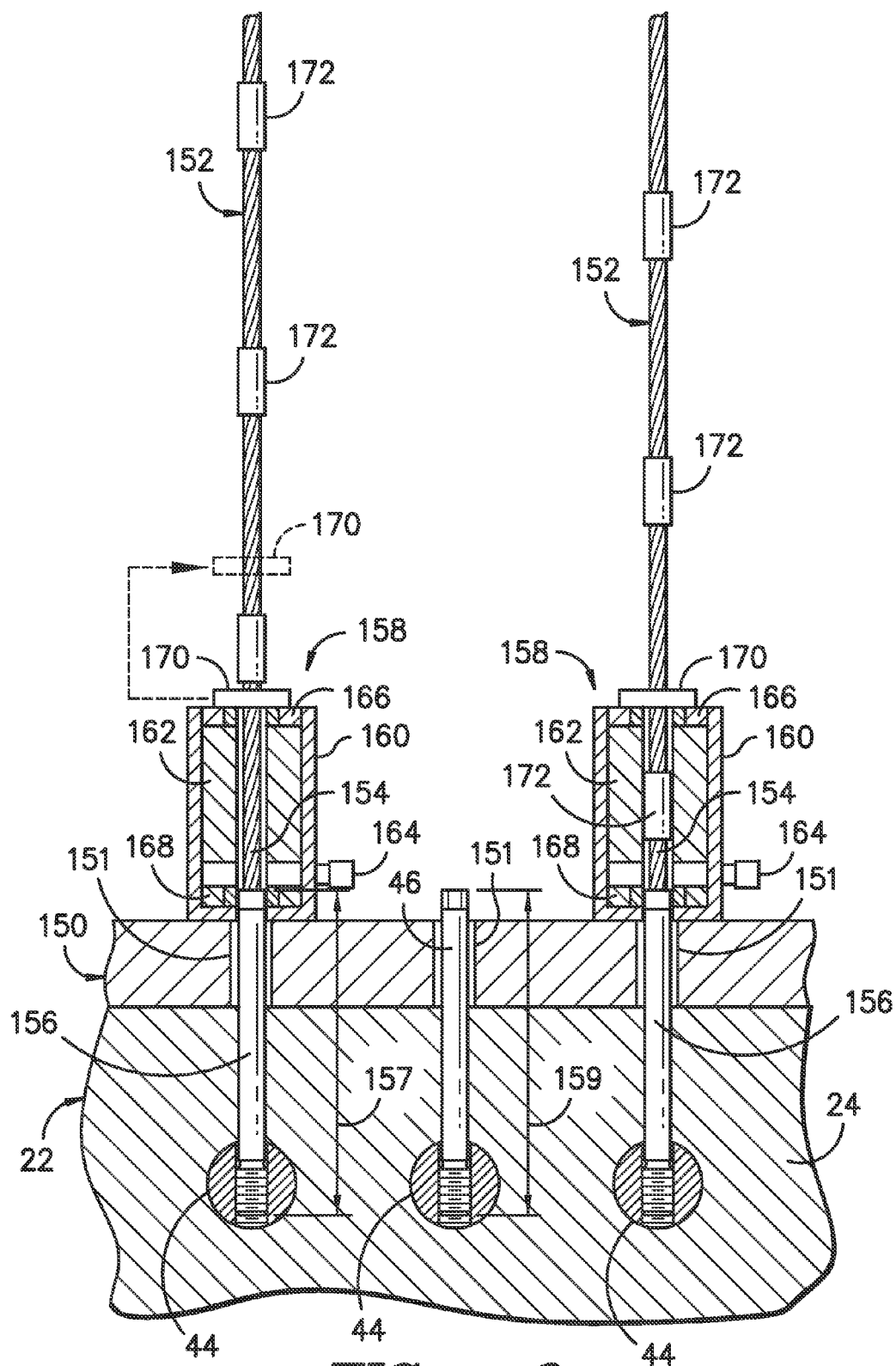
FIG. -6-

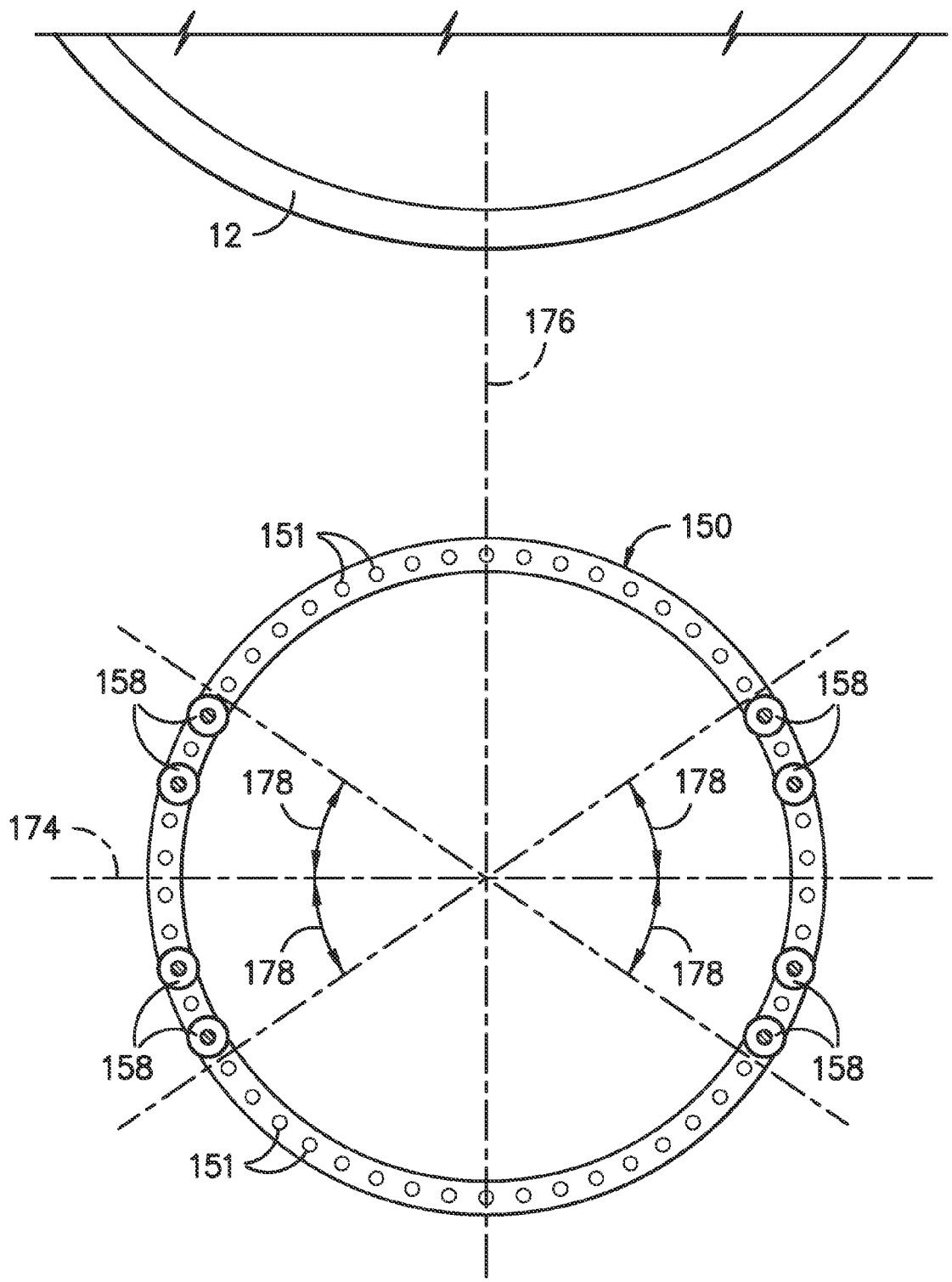
FIG. -7-

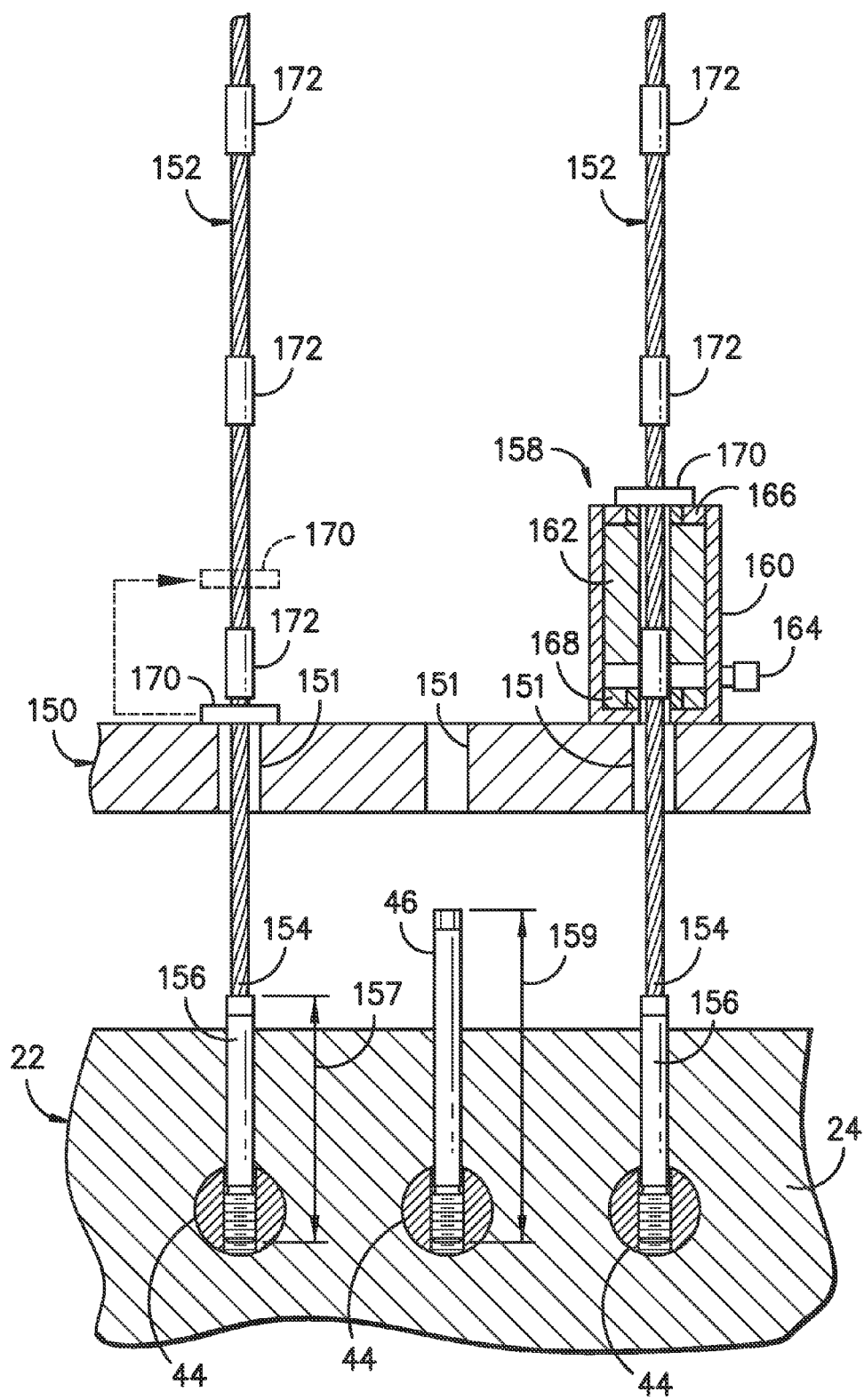
FIG. -8-

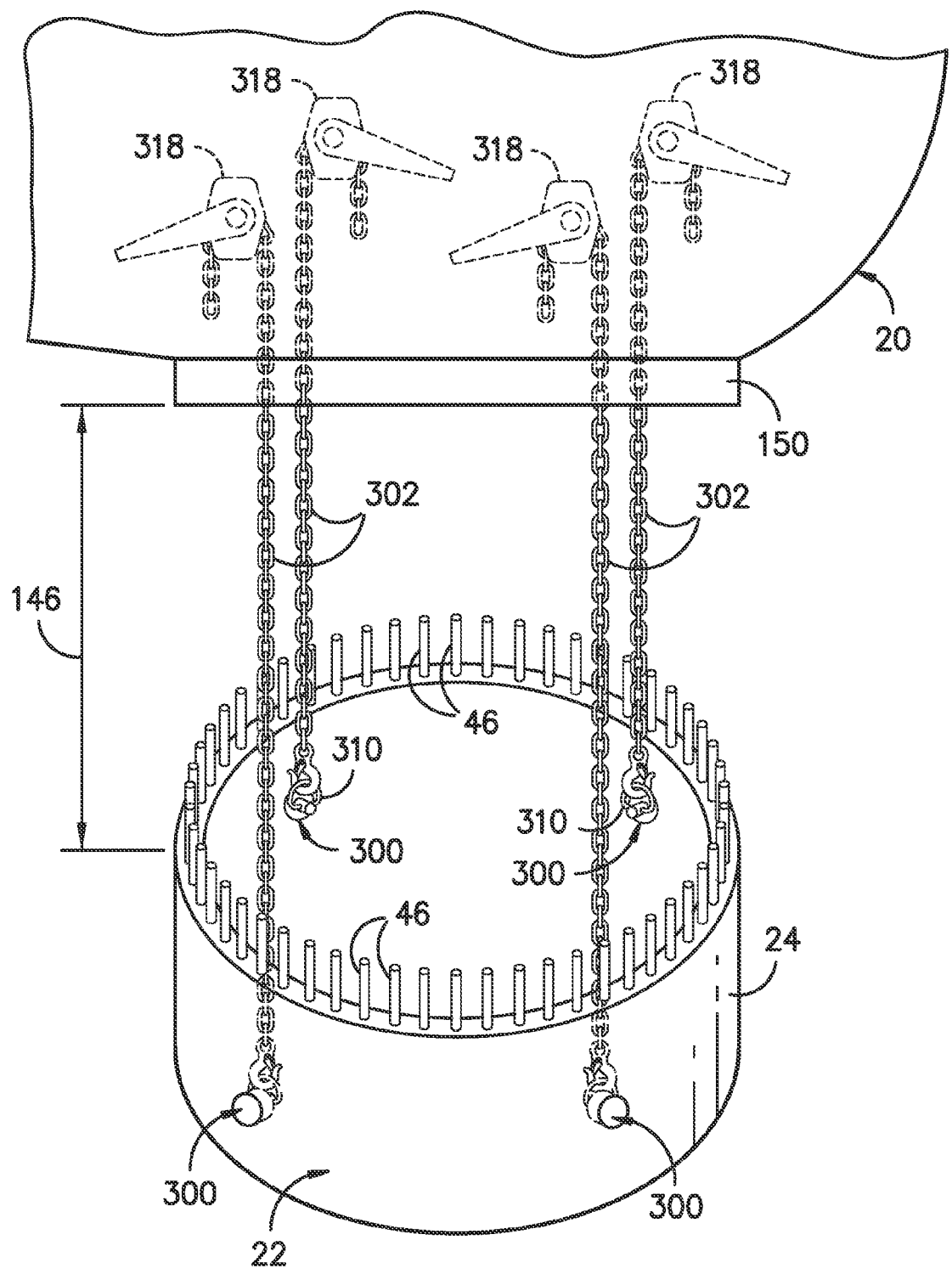
FIG. —9—

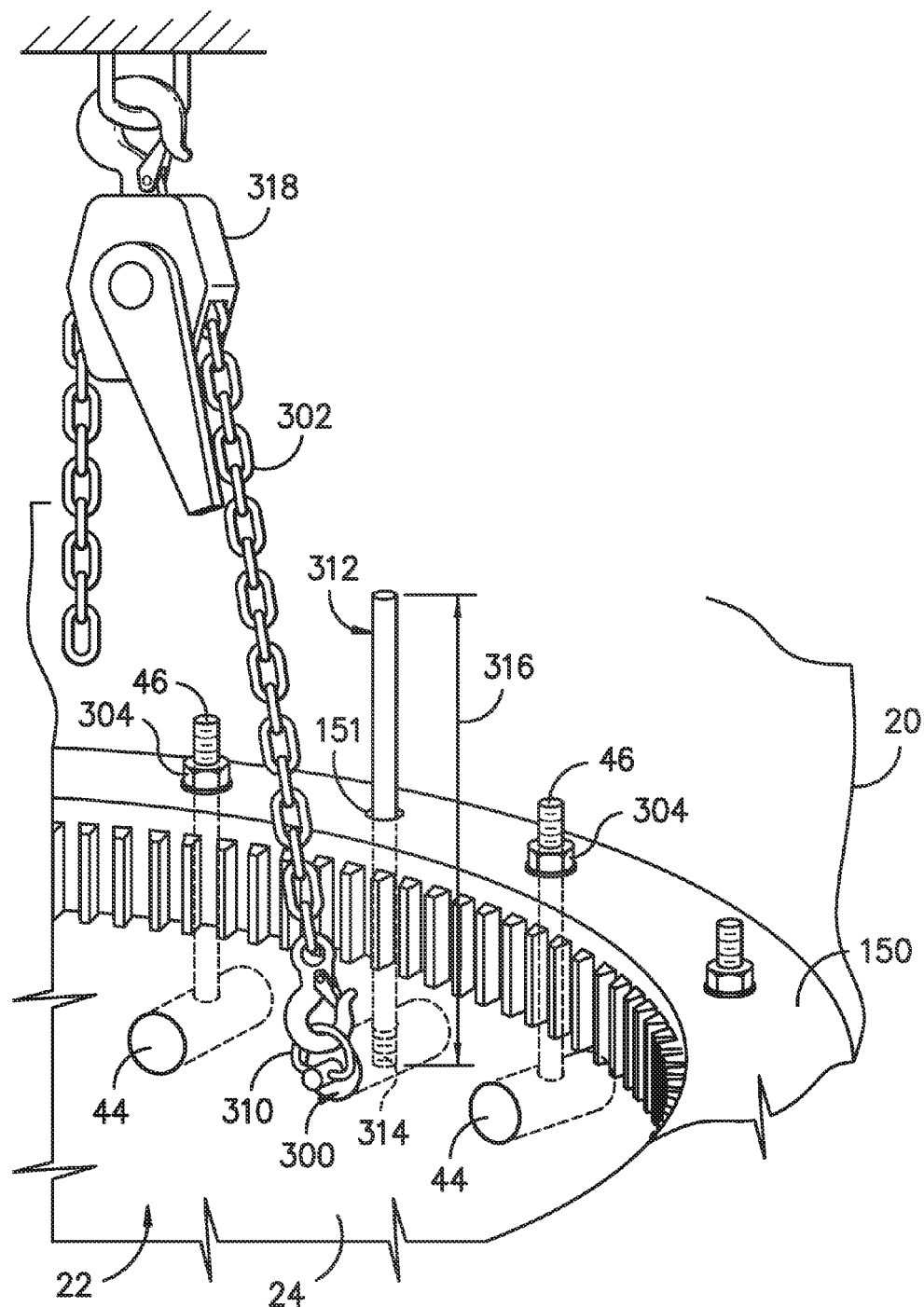
FIG. -10-

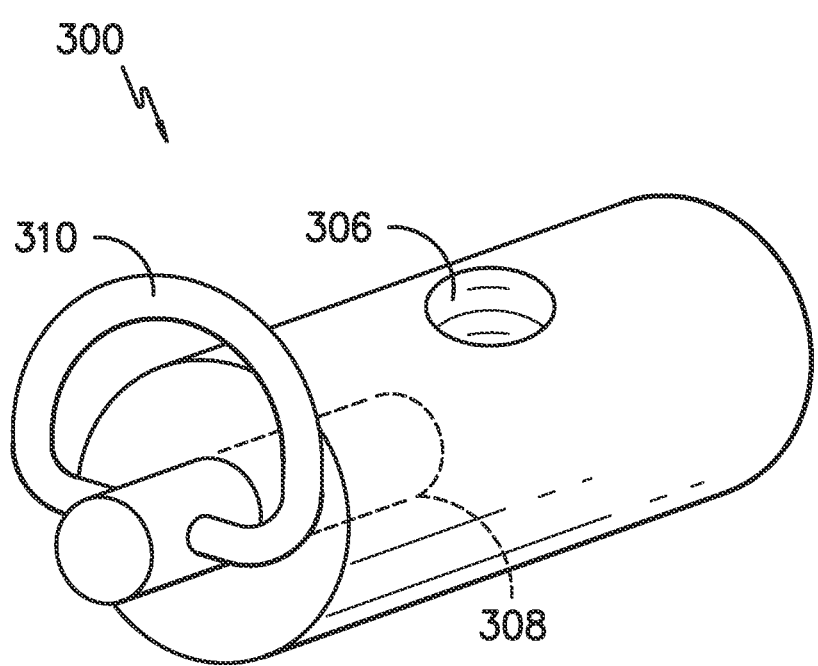
FIG. -11-

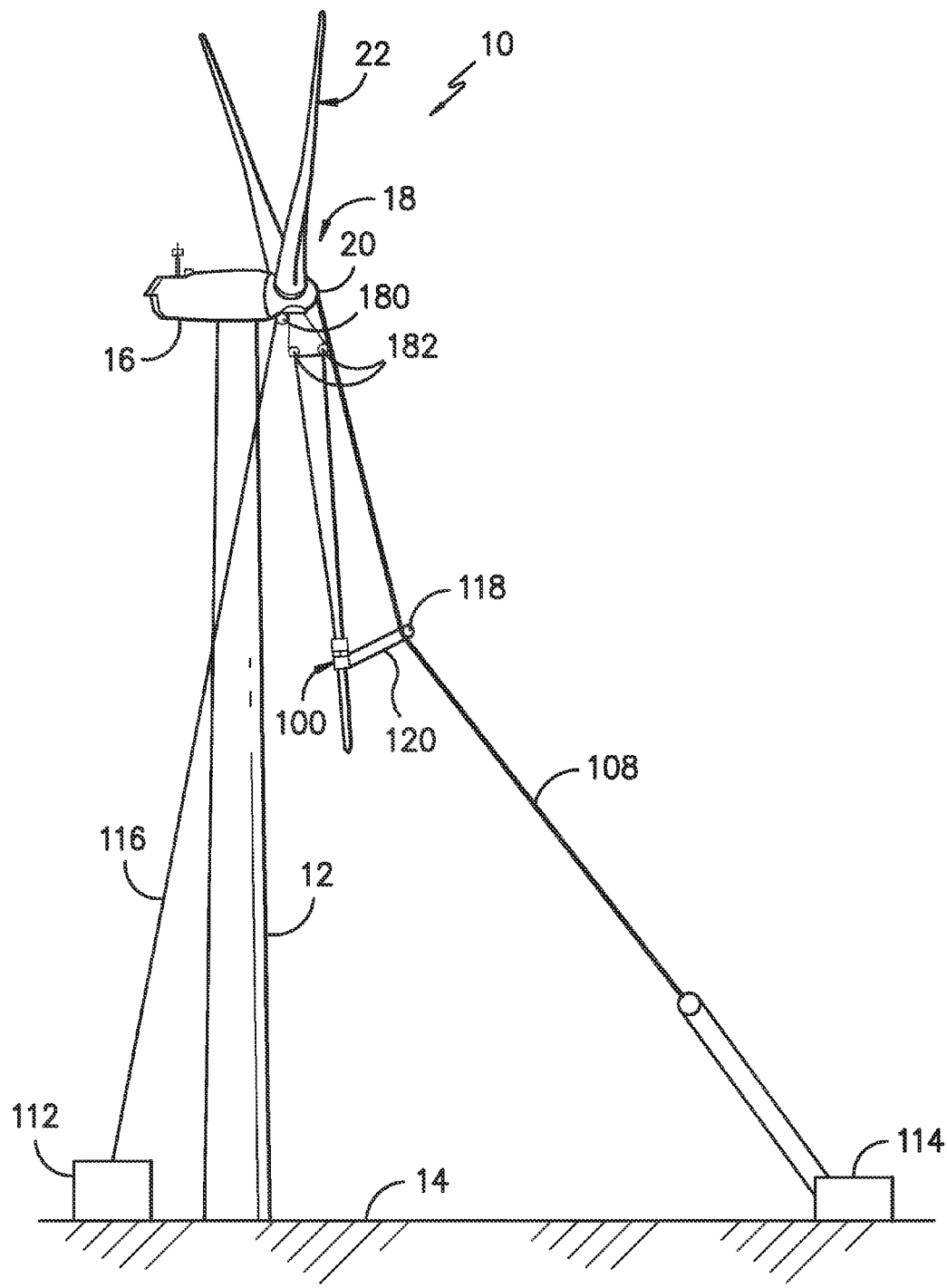
FIG. -12-

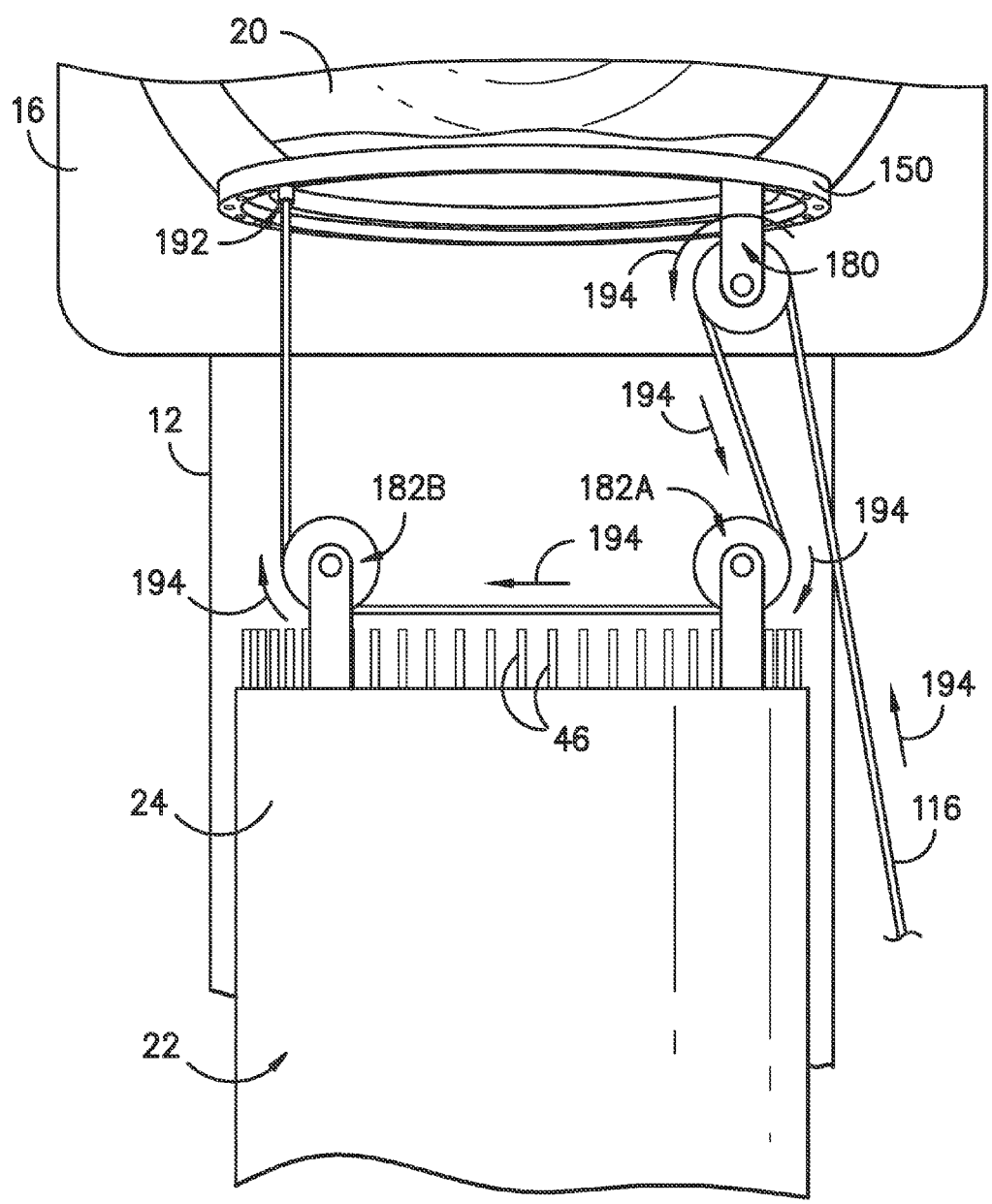
FIG. —13—

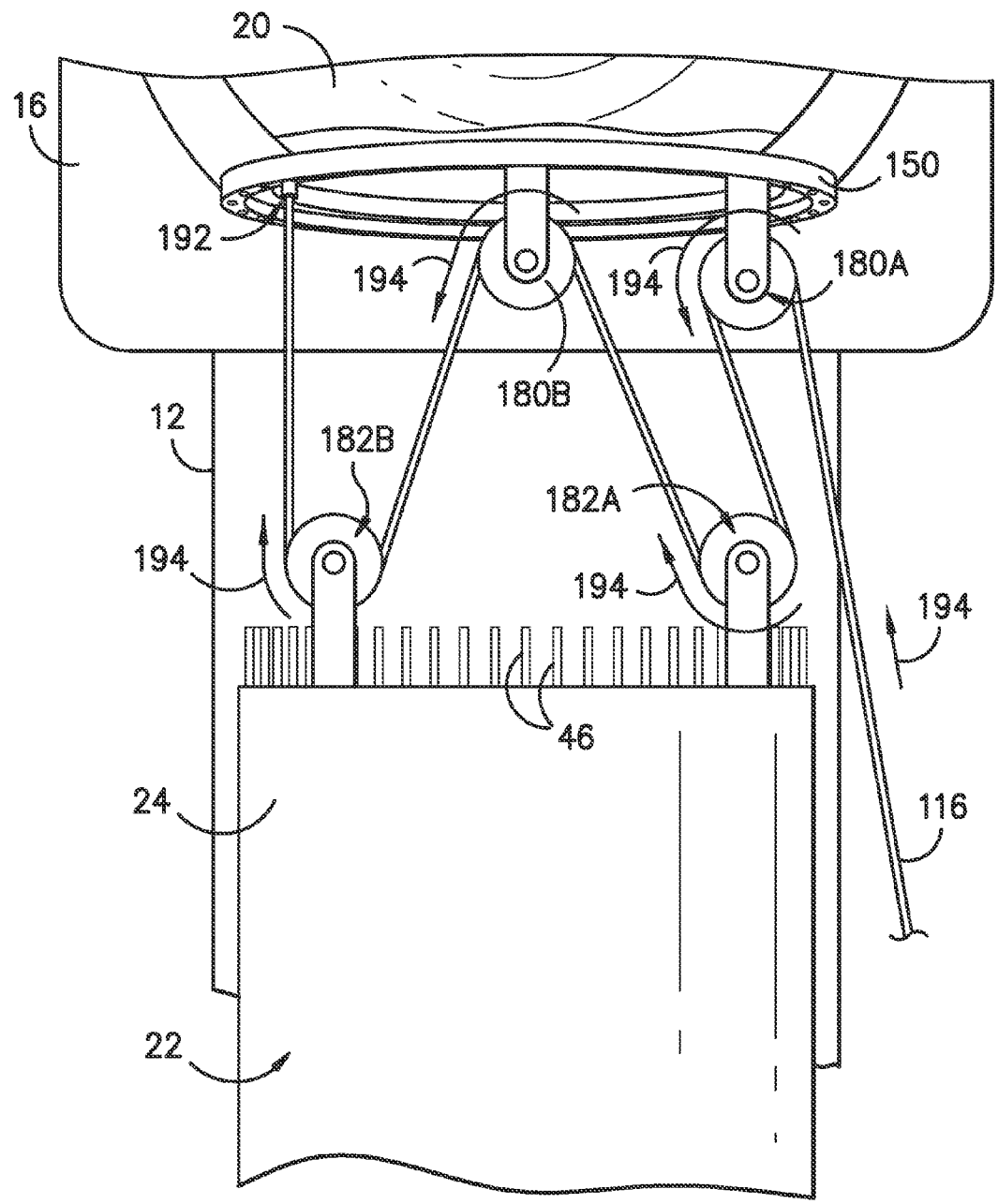
FIG. -14-

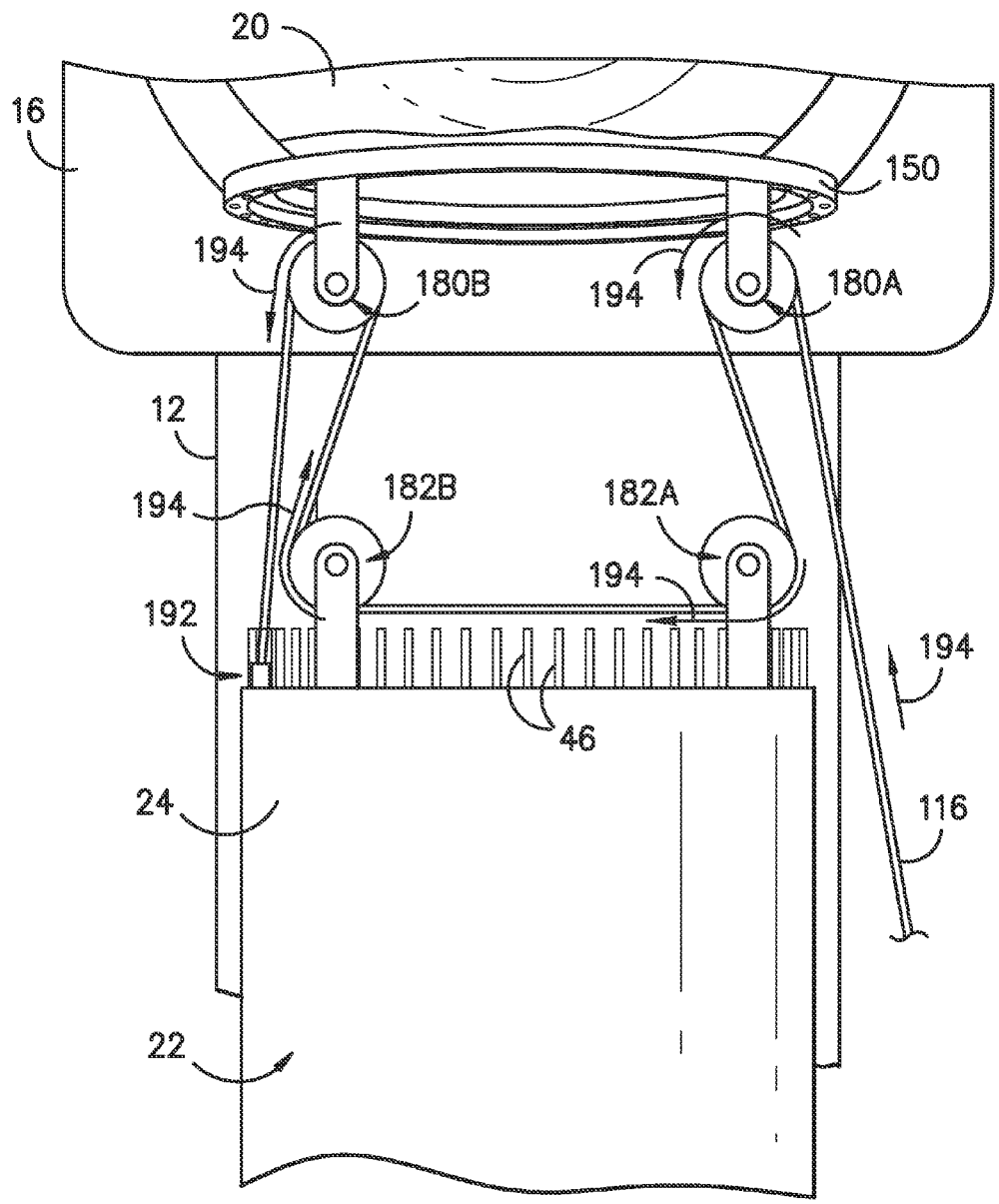
FIG. -15-

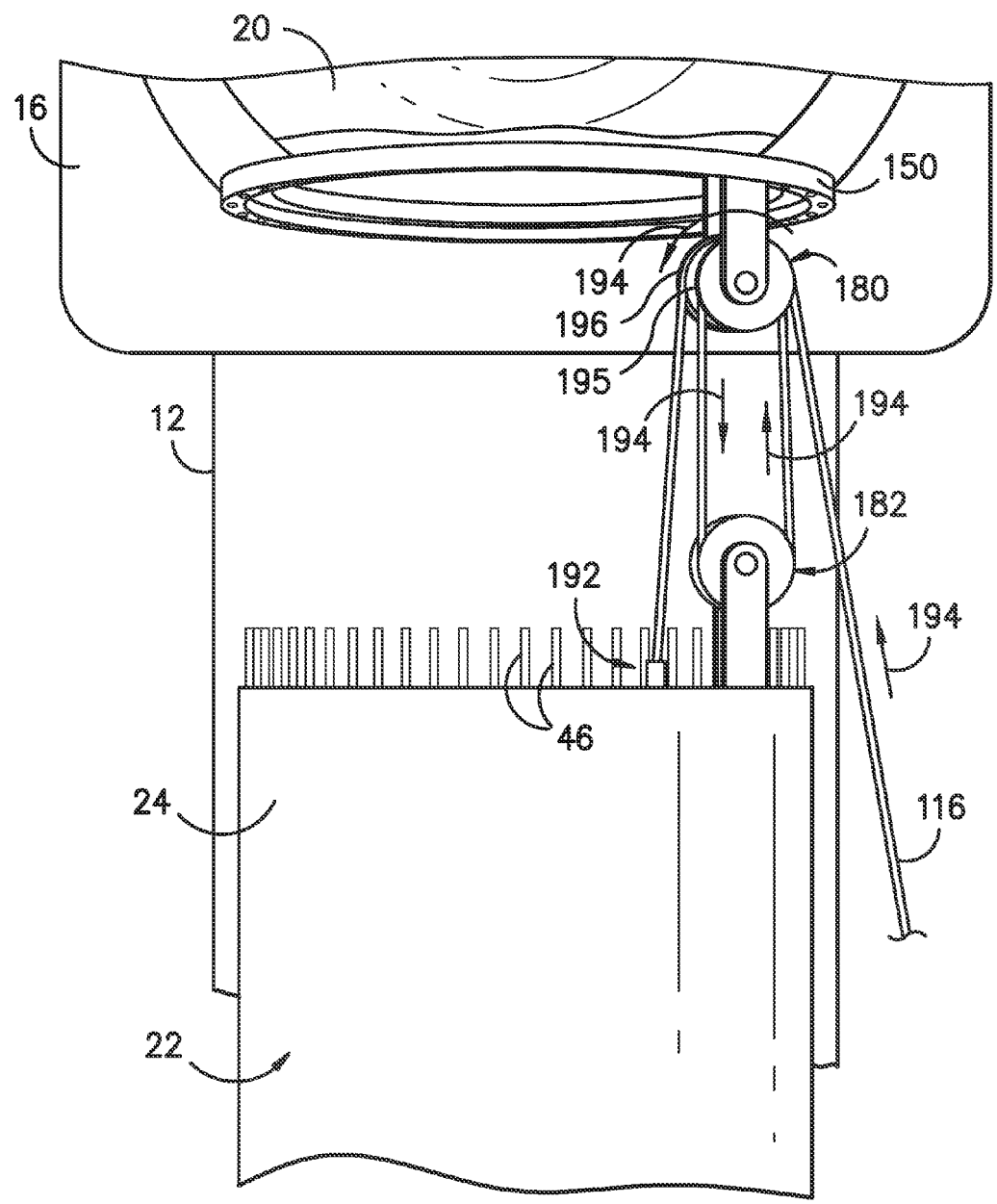
FIG. -16-

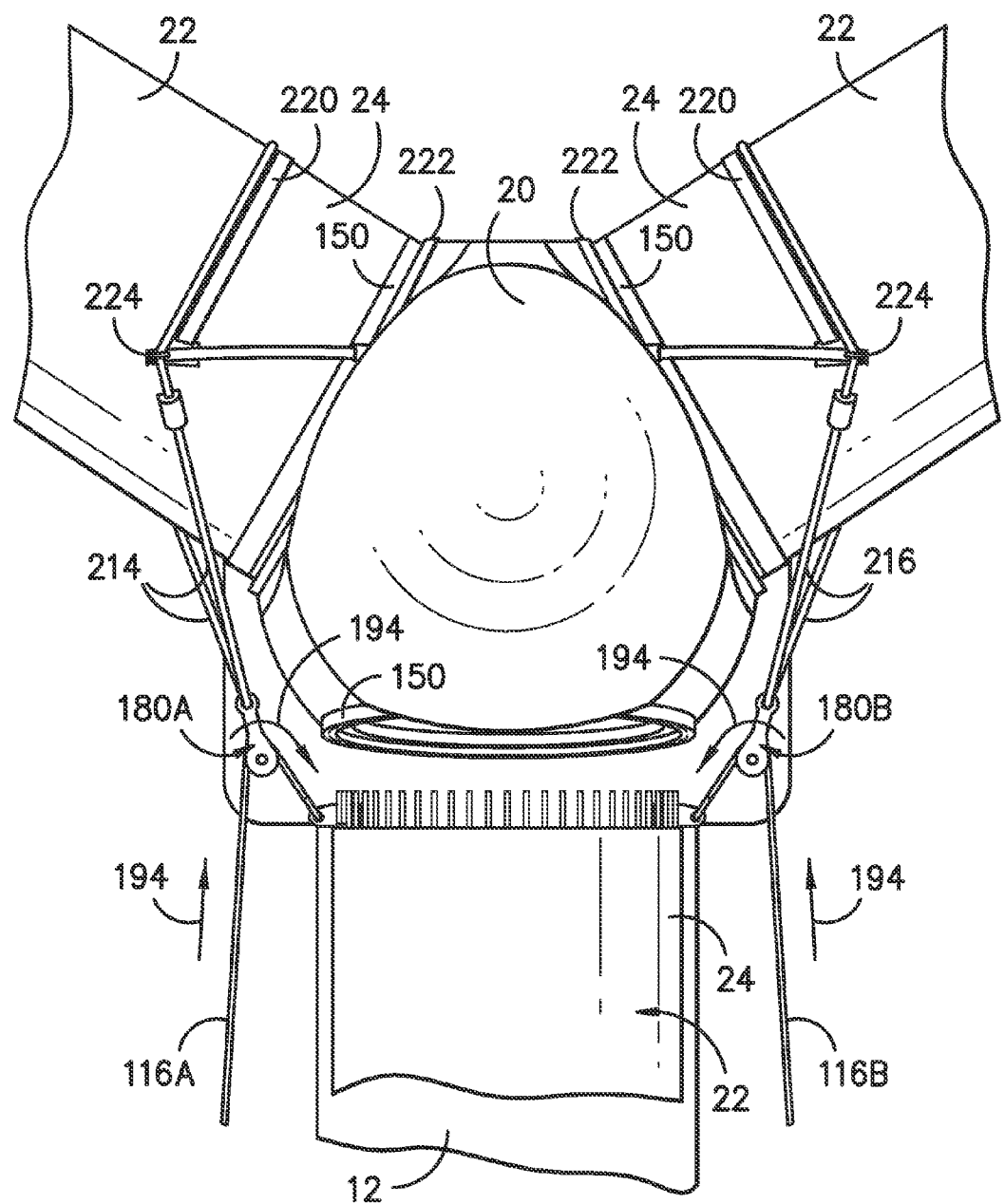
FIG. -17-

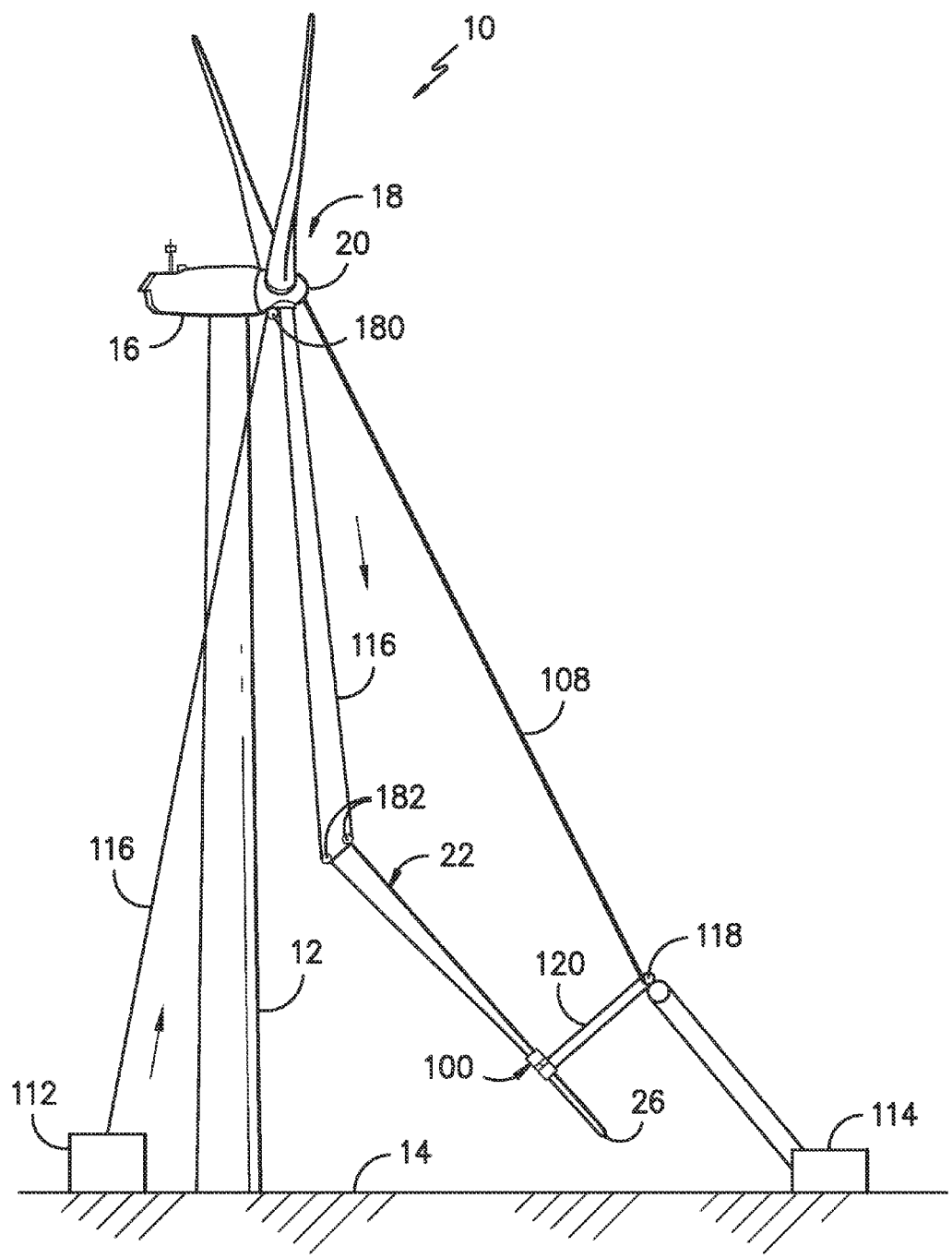
FIG. -18-

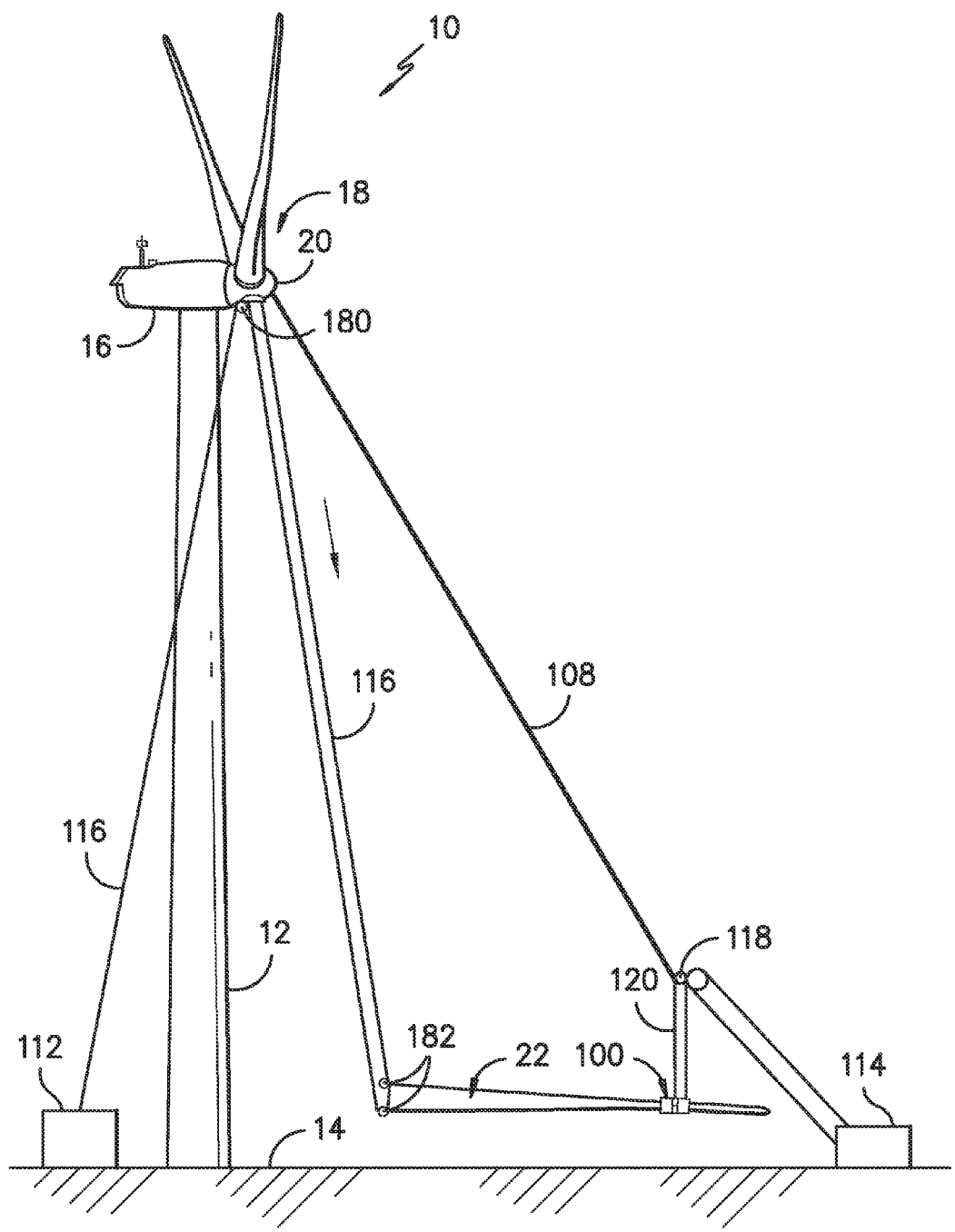
FIG. -19-

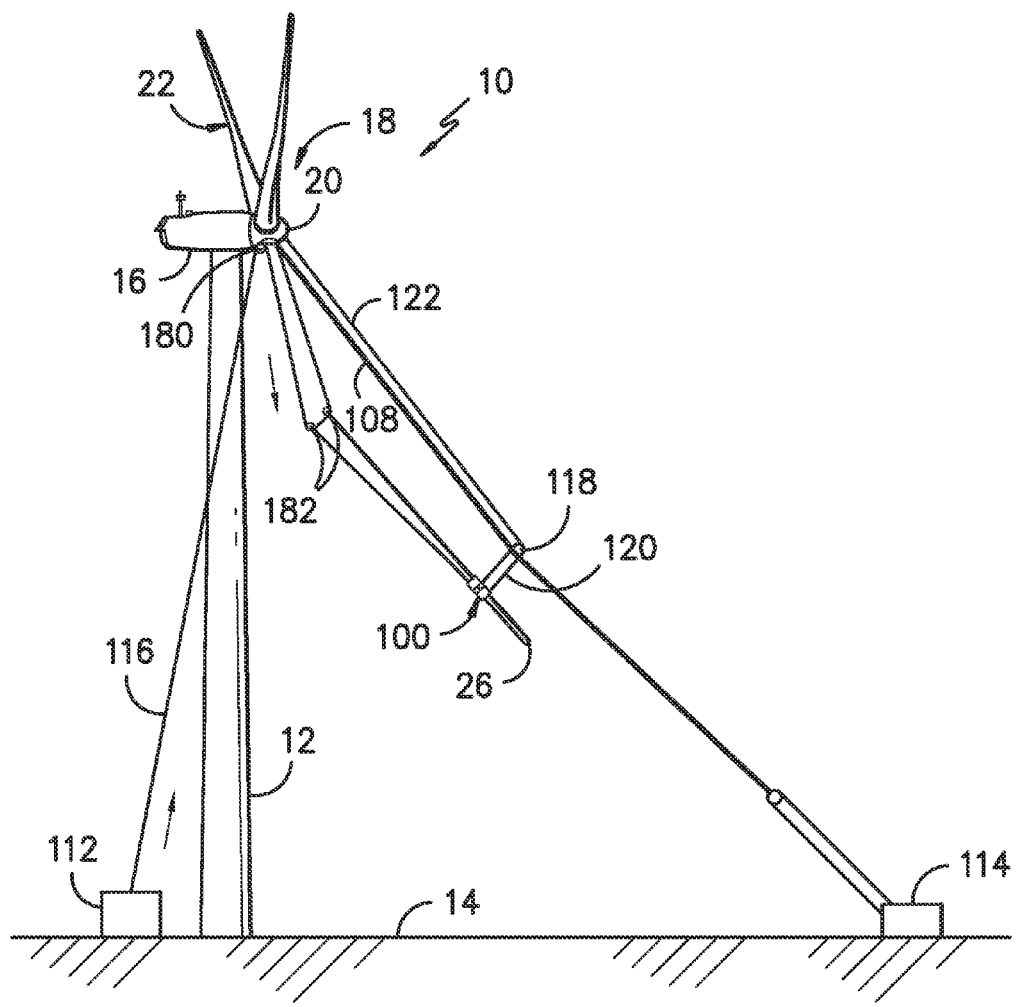
FIG. -20-

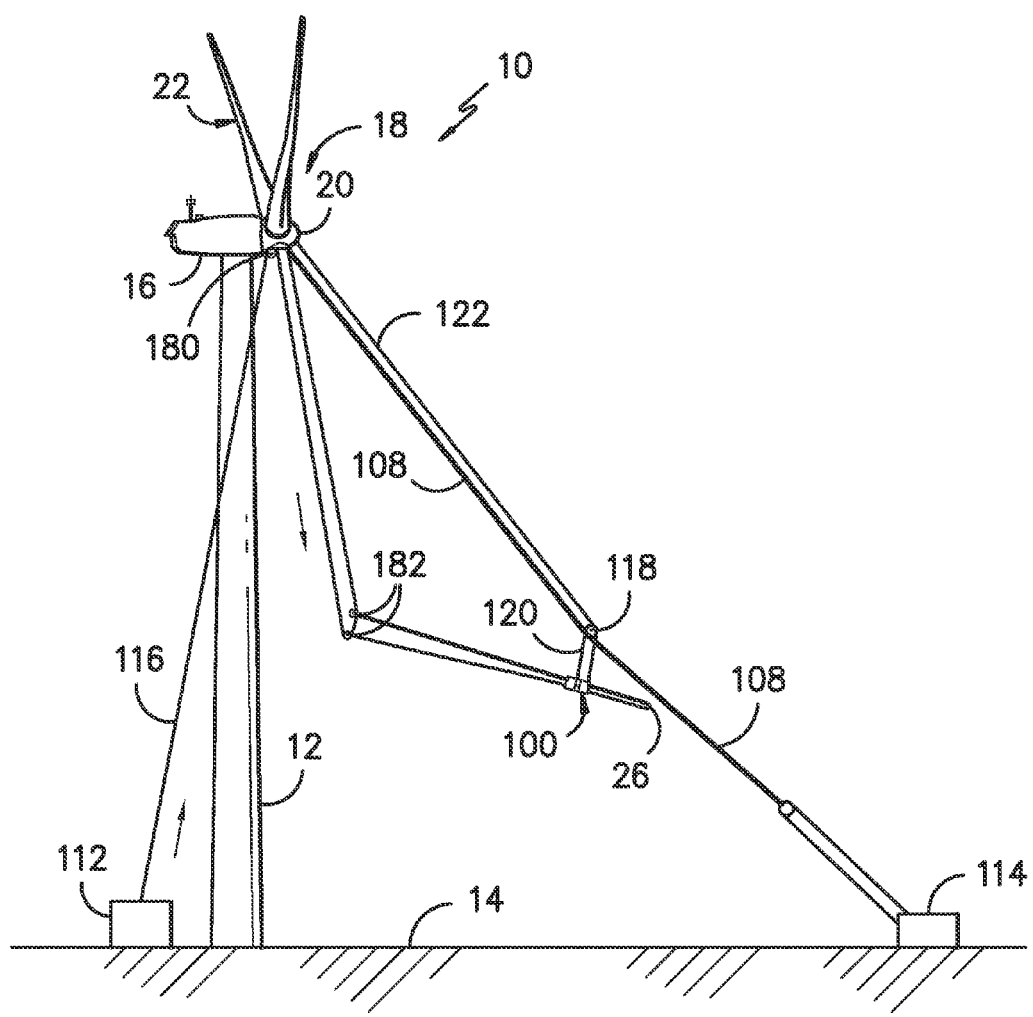
FIG. -21-

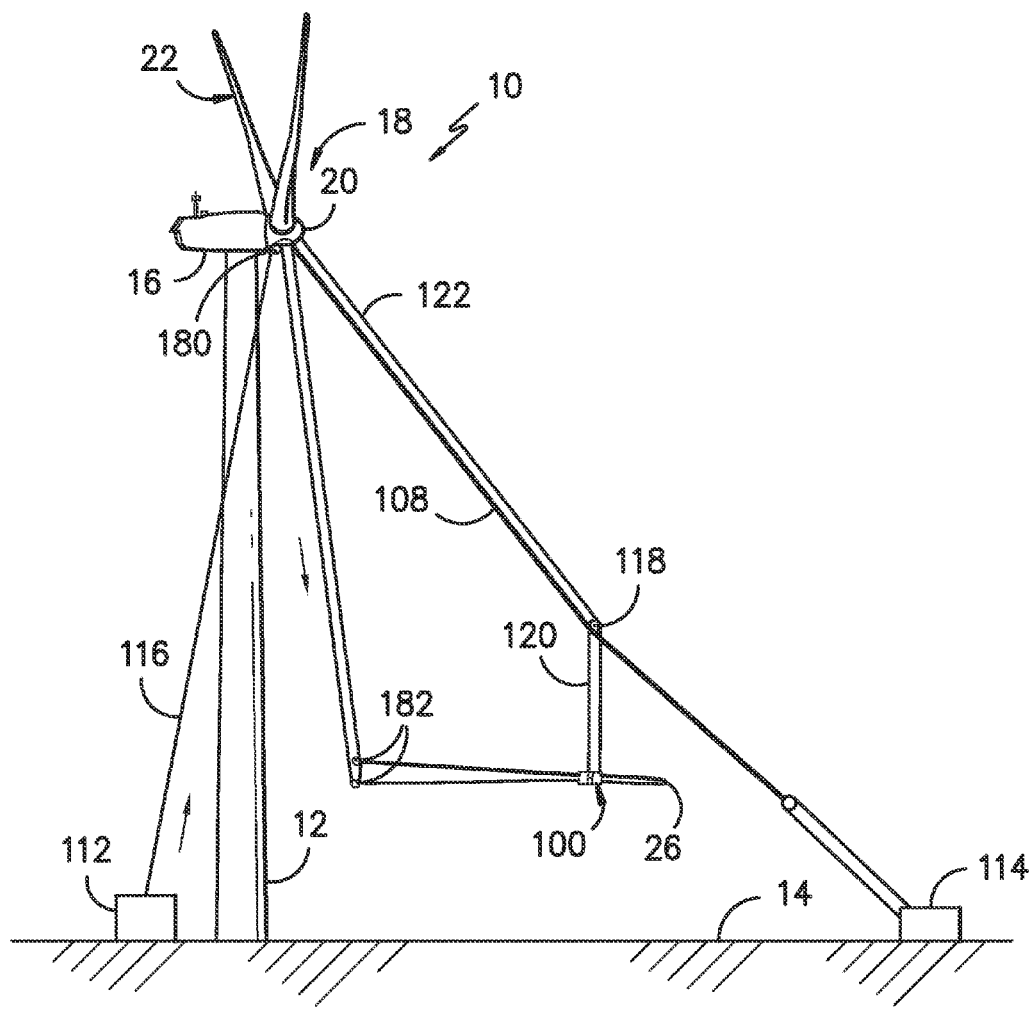
FIG. -22-

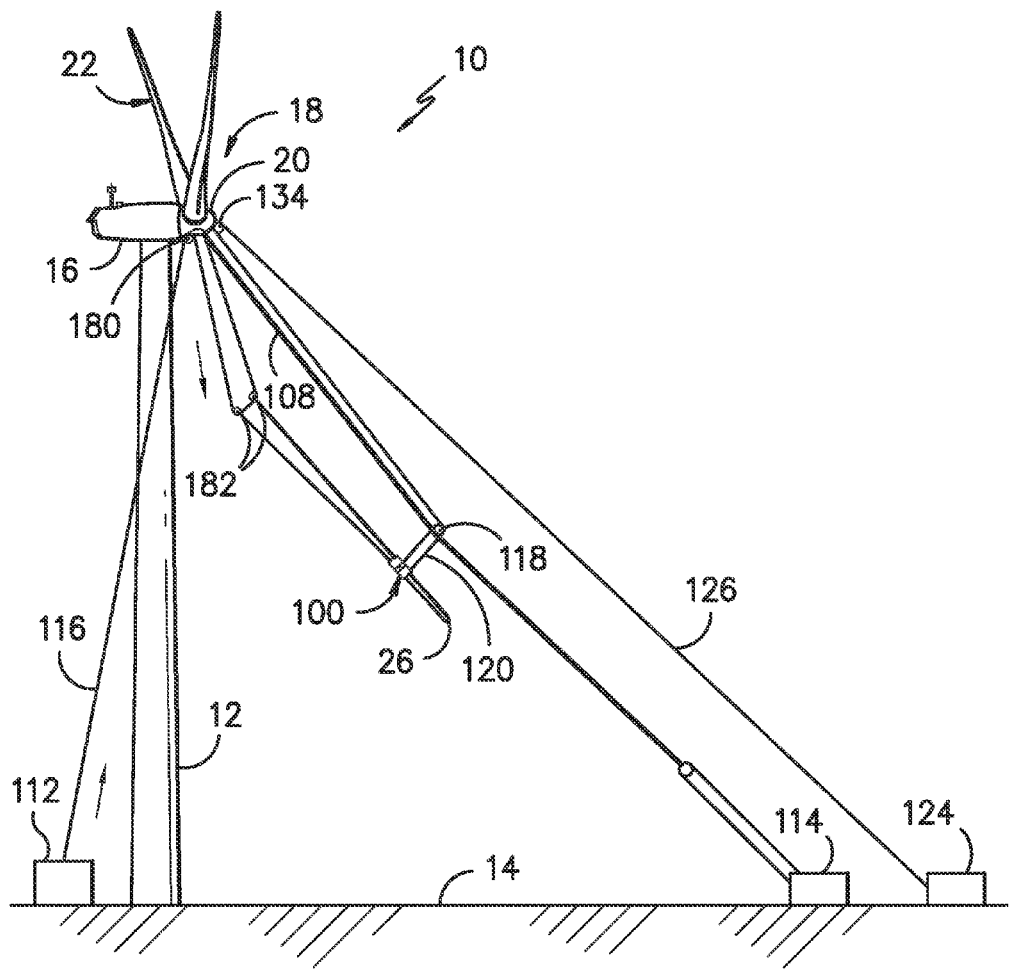
FIG. -23-

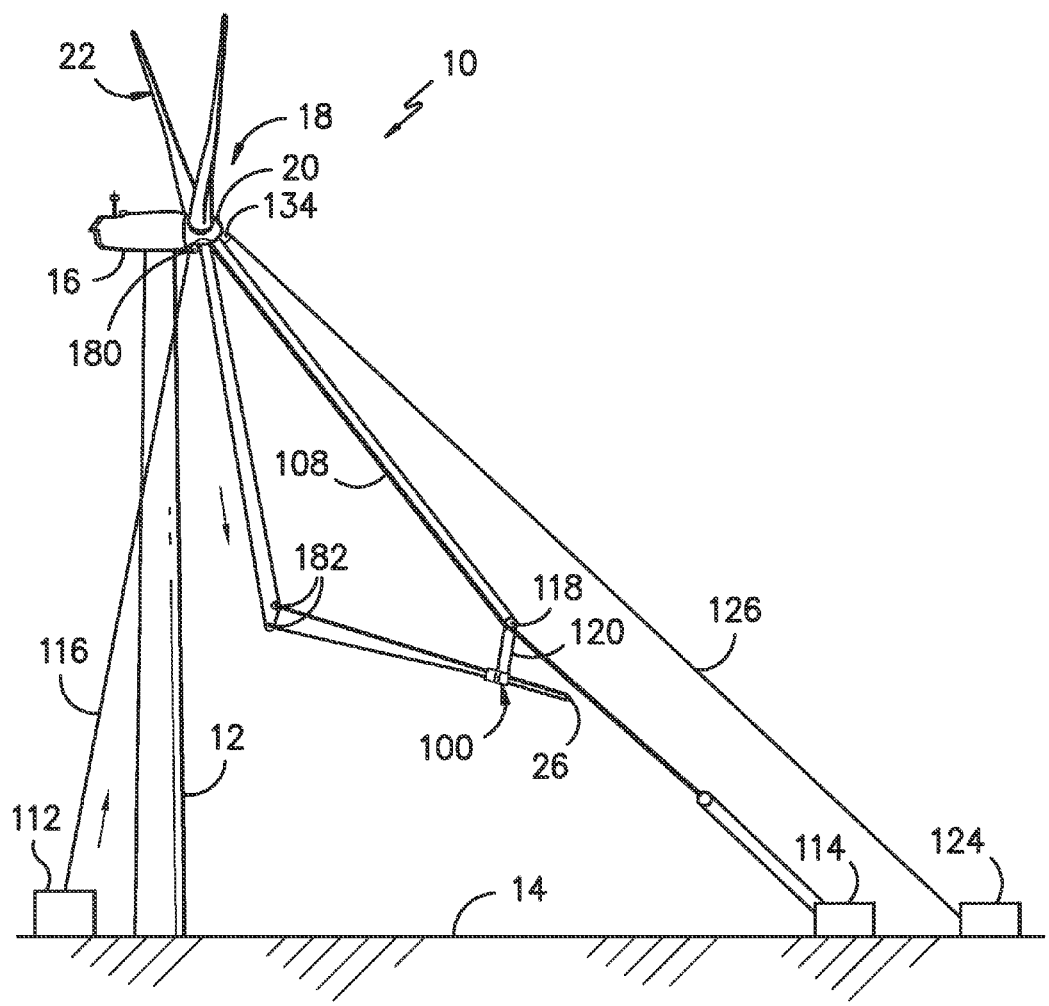
FIG. -24-

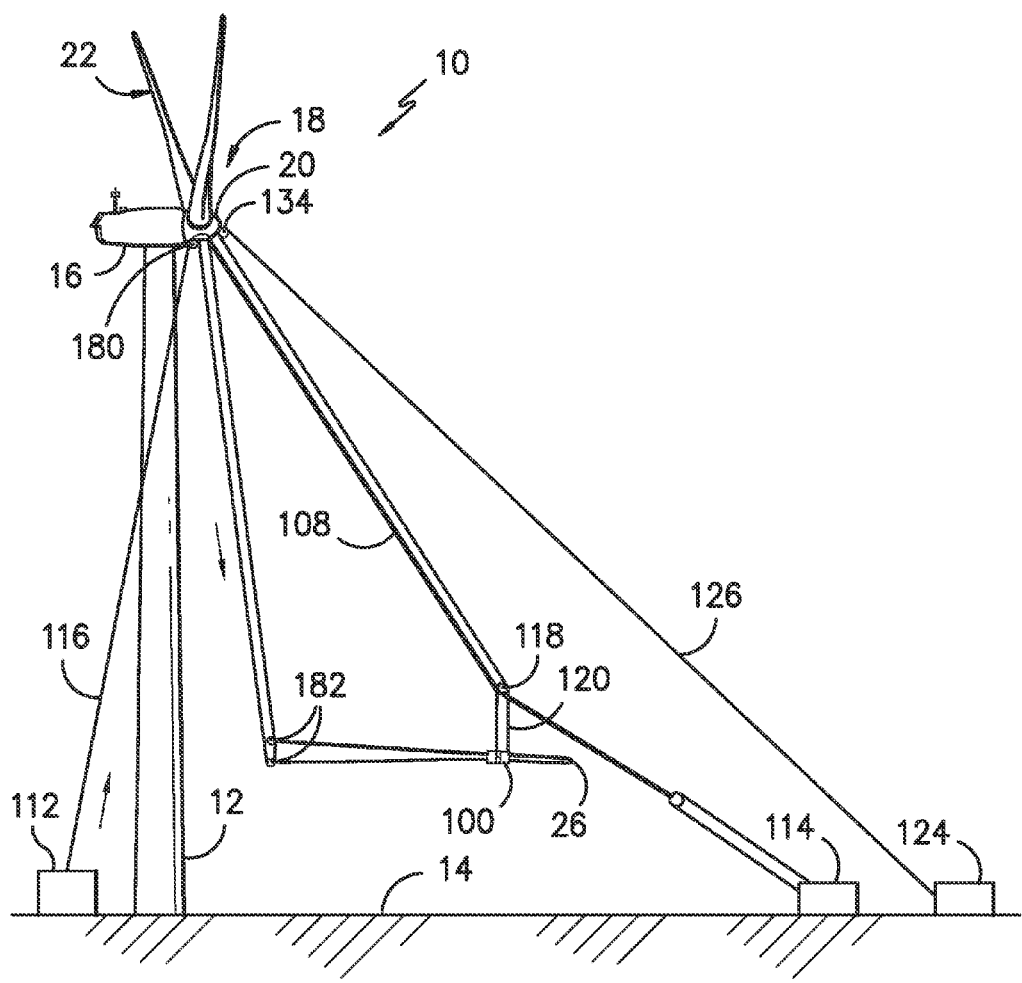
FIG. -25-

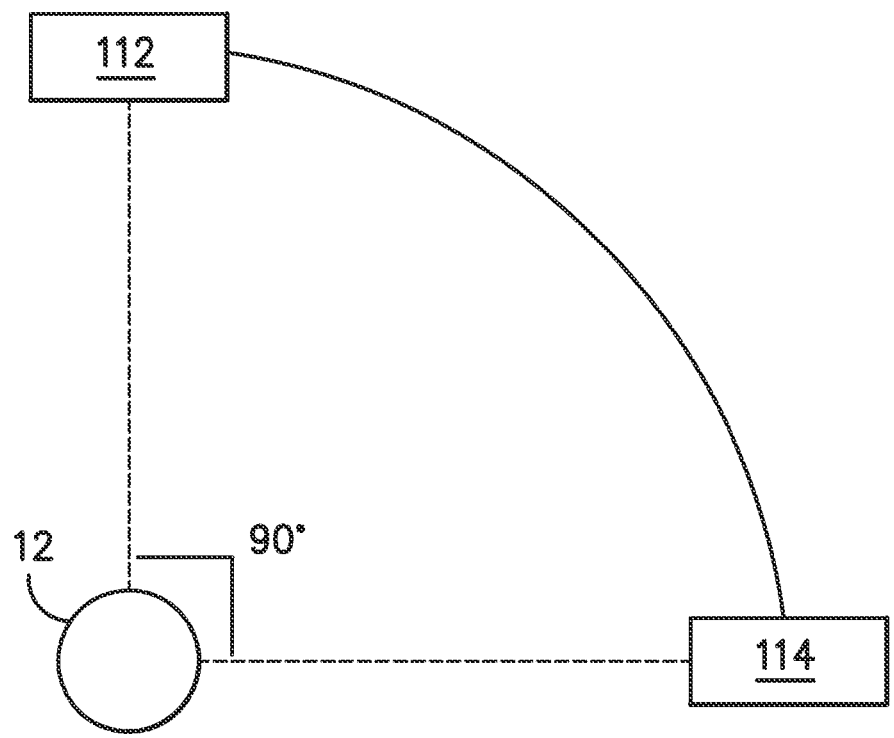
FIG. —26—
FIG. —27—

SYSTEM AND METHOD FOR REMOVING AND/OR INSTALLING A ROTOR BLADE OF A WIND TURBINE

FIELD OF THE INVENTION

The present disclosure relates generally to wind turbines, and more particularly to systems and methods for removing and/or installing a rotor blade of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Typically, to initially install a rotor blade onto the wind turbine hub and/or to remove one of the existing rotor blades from the hub, a significantly large crane must be transported to the wind turbine site in order to provide a means for raising and/or lowering the rotor blade relative to the hub. Unfortunately, it is often extremely expensive to both transport the crane to the wind turbine site and operate the crane for the amount of time necessary to install and/or remove the rotor blade(s). As a result, the costs of employing such large cranes currently accounts for a significant portion of the overall costs associated with initial wind turbine installations and rotor blade maintenance operations.

Accordingly, improved methods and related systems for removing and/or installing wind turbine rotor blades that do not require the use of a significantly large crane would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for removing a rotor blade from a rotor of a wind turbine installed atop a wind turbine tower. The method includes attaching at least one up-tower pulley to an up-tower location of the wind turbine, e.g. the rotor. Another step includes attaching a pulley cable from a first ground winch over the up-tower pulley to the rotor blade, e.g. the blade root. Still another step includes attaching a guide line from a second ground winch to an up-tower location of the wind turbine. The method also includes attaching a guide pulley to the guide line, wherein the guide pulley is configured to move along the guide line. A further step includes attaching a guide cable from the guide line over the guide pulley to the rotor blade, e.g. at the blade tip, so as to control an orientation of the rotor blade relative to the tower as the rotor blade is being lowered. A next step includes lowering the rotor blade by coordinated winch operation to a location on or adjacent to a support surface of the wind turbine.

In another aspect, the present disclosure is directed to a method for lifting a rotor blade from a support surface to a rotor of a wind turbine installed atop a wind turbine tower. The method includes attaching a pulley cable from a first ground winch over an up-tower pulley at an up-tower location of the wind turbine, e.g. the rotor, to a blade root of the rotor blade. Still another step includes attaching a guide line from an up-tower location of the wind turbine to a second ground winch, wherein the guide line has a guide pulley configured thereon. Further, the guide pulley is configured to move along the guide line during installation of the rotor blade. The method also includes attaching a guide cable from the guide line over the guide pulley to the rotor blade so as to control an orientation of the rotor blade relative to the tower as the rotor blade is being lifted. A next step includes lifting the rotor blade via the pulley cable by coordinated ground winch operation to the rotor such that the rotor blade may be installed onto the rotor.

In yet another aspect, the present disclosure is directed to a system for lifting or removing a rotor blade of a wind turbine to and from a wind turbine tower. The system includes at least one up-tower pulley mounted on an up-tower location of the wind turbine (e.g. the rotor), first and second winches disposed at a location at or adjacent to a support surface of the tower, a pulley cable from the first ground winch over the up-tower pulley and attached to the rotor blade, a guide line attached between the second ground winch and an up-tower location of the wind turbine, a guide pulley mounted on the guide line, and a guide cable from the guide line over the guide pulley to the rotor blade. The guide pulley is configured to move along the guide line during lifting and removing of the rotor blade and the guide cable is configured to control an orientation of the rotor blade relative to the tower during lifting and removing of the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine according to one embodiment of the present disclosure;

FIG. 2 illustrates a perspective view of a rotor blade according to one embodiment of the present disclosure;

FIG. 3 illustrates another perspective view of the wind turbine shown in FIG. 1, particularly illustrating a rotor blade to be removed from the wind turbine positioned in a generally vertical orientation relative to a support surface of the wind turbine and a blade sock installed onto the rotor blade;

FIG. 4 illustrates another perspective view of the wind turbine shown in FIG. 3, particularly illustrating the rotor blade lowered to an initial vertical height and a blade sock installed onto the rotor blade;

FIG. 5 illustrates a close-up, partial perspective view of the rotor blade and the hub shown in FIG. 4, particularly illustrating one embodiment of a lowering system including support cables secured to the rotor blade and extending through both a pitch bearing of the wind turbine and corresponding cable translation devices positioned within the hub;

FIG. 6 illustrates a cross-sectional view of the rotor blade and the pitch bearing shown in FIG. 5 prior to the rotor blade being lowered from the hub, particularly illustrating a pair of the support cables and cable translation devices of the lowering system shown in FIG. 5;

FIG. 7 illustrates a top-down view of the pitch bearing shown in FIGS. 5 and 6, particularly illustrating the circumferentially positioning of the cable translation devices around the pitch bearing relative to a tower reference line extending radially from the center of the wind turbine tower through the center of the pitch bearing;

FIG. 8 illustrates a similar cross-sectional view to that shown in FIG. 6, particularly illustrating a variation of the blade lowering system shown in FIG. 6 in which each pair of support cables secured to the rotor blade includes one support cable in operative association with a corresponding cable transition device and another support cable extending through the pitch bearing without being received within a cable translation device;

FIG. 9 illustrates a close-up, partial perspective view of the rotor blade and the hub shown in FIG. 4, particularly illustrating another embodiment of a lowering system including support cables secured to the rotor blade and corresponding cable translation devices positioned within the hub;

FIG. 10 illustrates a close-up, partial perspective view of the interface between the rotor blade and the pitch bearing shown in FIG. 9 prior to the rotor blade being lowered from the hub, particularly illustrating a support cable coupled between a support nut installed within the blade root and a corresponding cable translation device positioned within the hub;

FIG. 11 illustrates a perspective view of the support nut shown in FIG. 10;

FIG. 12 illustrates another perspective view of the wind turbine shown in FIG. 4, particularly illustrating a pulley cable coupled between the rotor blade and a first winch via one or more up-tower pulleys and a guide line having a guide pulley mounted thereto, wherein the guide line is mounted between the rotor and a second winch;

FIG. 13 illustrates one embodiment of a pulley arrangement that may be utilized to lower the rotor blade relative to the hub according to the present disclosure;

FIG. 14 illustrates another embodiment of a pulley arrangement that may be utilized to lower the rotor blade relative to the hub according to the present disclosure;

FIG. 15 illustrates a further embodiment of a pulley arrangement that may be utilized to lower the rotor blade relative to the hub according to the present disclosure;

FIG. 16 illustrates yet another embodiment of a pulley arrangement that may be utilized to lower the rotor blade relative to the hub according to the present disclosure;

FIG. 17 illustrates an even further example of a pulley arrangement that may be utilized to lower the rotor blade relative to the hub according to the present disclosure;

FIG. 18 illustrates another perspective view of the wind turbine shown in FIG. 12, particularly illustrating the rotor blade being rotated to a horizontal position as the blade is being lowered via the pulley cable and the guide cable of the guide line;

FIG. 19 illustrates another perspective view of the wind turbine shown in FIG. 18, particularly illustrating the rotor blade being held in a substantially horizontal position;

FIG. 20 illustrates another perspective view of the wind turbine shown in FIG. 12, particularly illustrating an additional pulley cable mounted between the rotor blade and the guide pulley to control a location of the guide pulley;

FIG. 21 illustrates another perspective view of the wind turbine shown in FIG. 20, particularly illustrating the rotor blade being rotated to a substantially horizontal position;

FIG. 22 illustrates another perspective view of the wind turbine shown in FIG. 21, particularly illustrating the rotor blade in a substantially horizontal position;

FIG. 23 illustrates another perspective view of the wind turbine shown in FIG. 12, particularly illustrating a third pulley mounted to the rotor and having an additional pulley cable over the third pulley between the guide pulley and a third winch, wherein the additional pulley cable is configured to control a location of the guide pulley;

FIG. 24 illustrates another perspective view of the wind turbine shown in FIG. 23, particularly illustrating the rotor blade being rotated to a substantially horizontal position;

FIG. 25 illustrates another perspective view of the wind turbine shown in FIG. 23, particularly illustrating the rotor blade in a substantially horizontal position;

FIG. 26 illustrates a top view of one embodiment of a layout of the wind turbine and the winches of the present disclosure, particularly illustrating the first and second winches positioned at a 90-degree angle with respect to each other and the tower; and FIG. 27 illustrates a top view of another embodiment of a layout of the wind turbine and the winches of the present disclosure, particularly illustrating the first and second winches positioned adjacent to or atop one another.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to various methods for removing rotor blades from and/or installing rotor blades onto a wind turbine. Specifically, as will become apparent from the description provided below, the disclosed methods may allow for the removal and installation of rotor blades without the use of a large, expensive crane, thereby significantly reducing the costs associated with blade removal and/or blade installation.

For example, in several embodiments, to lower a rotor blade from a hub of the wind turbine, at least one up-tower pulley is attached to an up-tower location of the wind turbine, e.g. the rotor. Additionally, a pulley cable is attached from a main or first ground winch over the up-tower pulley to a blade root of the rotor blade and may be used to lower the rotor blade relative to the hub. A guide line having a guide pulley mounted thereto is also attached to the rotor and a second ground winch. Thereafter, a guide cable can be attached from the guide line over the guide pulley to the rotor blade so as to control an orientation of the rotor blade relative to the tower as the rotor blade is being lowered. The pulley cable(s), in combination with the guide line and the guide cable, may then be used to lower the rotor blade onto and/or adjacent to a support surface of the rotor blade. Accordingly, the rotor blade may be lowered in a controlled manner by coordinated winch operation. As will be described below, such method steps may also, in several embodiments, be reversed to allow for the installation of a rotor blade onto a wind turbine.

It should be appreciated that, in addition to the disclosed methods, the present subject matter is also directed to a system for removing rotor blades from and/or installing rotor blades onto a wind turbine. Specifically, the system may generally include any combination of the various components described herein as being used during the performance of any of the disclosed methods.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 19 may include more or less than three rotor blades 22. Each rotor blade 22 may be spaced about the hub 20 to facilitate rotating the rotor 19 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIG. 2, a perspective view of one of the rotor blades 22 shown in FIG. 1 is illustrated in accordance with aspects of the present subject matter. As shown, the rotor blade 22 includes a blade root 24 configured for mounting the rotor blade 22 to the hub 20 of a wind turbine 10 (FIG. 1) and a blade tip 26 disposed opposite the blade root 24. A body 28 of the rotor blade 22 may extend lengthwise between the blade root 24 and the blade tip 26 and may generally serve as the outer shell of the rotor blade 22. As is generally understood, the body 28 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 28 may generally include a pressure side 30 and a suction side 32 extending between a leading edge 34 and a trailing edge 36. Additionally, the rotor blade 22 may have a span 38 defining the total length of the body 28 between the blade root 24 and the blade tip 26 and a chord 40 defining the total length of the body 28 between the leading edge 34 and the trailing edge 36. As is generally understood, the chord 40 may vary in length with respect to the span 38 as the body 29 extends from the blade root 24 to the blade tip 26.

Moreover, as shown in FIG. 2, the rotor blade 22 may also include a plurality of T-bolts or root attachment assemblies 42 for coupling the blade root 22 to the hub 20 of the wind turbine 10. In general, each root attachment assembly 42 may include a barrel nut 44 mounted within a portion of the blade root 24 and a root bolt 46 coupled to and extending from the barrel nut 44 so as to project outwardly from a root end 48 of the blade root 24. By projecting outwardly from the root end 48, the root bolts 46 may generally be used to couple the blade root 24 to the hub 20 via a pitch bearing 150 (FIG. 5) of the wind turbine 10. For example, the pitch bearing 150 may define a plurality of bolt holes 151 (FIGS. 6-7) configured to receive the root bolts 48. Additionally, as will be described below, a portion of such root bolts 46 may also be utilized when the rotor blade 22 is being removed from and/or installed onto the hub 20.

Various embodiments of methods for removing a rotor blade 22 from a wind turbine 10, including various system components that may be used in performing such methods, will now be described with reference to FIGS. 3-27. It should be appreciated that, although the methods will generally be described with reference to removing a rotor blade 22 from a wind turbine 10, the various method steps and system components disclosed herein may similarly be used to install a rotor blade 22 onto a wind turbine 10 by simply reversing the order in which the method is performed. It should also be appreciated that, although the methods will be described herein as being performed in a particular order, the methods may generally be performed in any suitable order that is consistent with the disclosure provided herein.

Referring particularly to FIG. 3, the rotor blade 22 to be removed may be initially rotated to a vertically downward position (e.g., a six o'clock position) such that the blade 22 has a generally vertical orientation relative to the support surface 14 of the wind turbine 10. For example, as shown in FIG. 3, the rotor blade 22 is extending vertically downward from the hub 20 such that the blade tip 26 is pointing towards the support surface 14. It should be appreciated that, due to a tilt angle and/or cone angle of the wind turbine 10, the rotor blade 22 may be angled slightly away from the tower 12 when moved to the vertically downward position.

In several embodiments, once the rotor blade 22 is rotated to the vertically downward position, an optional blade sock 100 may be installed onto the blade 22 to provide attachment points for various cables and/or lines of the present disclosure and/or to provide protection to the rotor blade 22. Further, as shown in FIG. 3, the blade sock 100 may be installed at an intermediate location 102 defined between the blade root 24 and the blade tip 26. In one embodiment, the intermediate location 102 may correspond to a location defined along an outboard section of the rotor blade 22, such as at a location spaced apart from the blade root 24 by a distance 104 that is greater that about 50% of the blade span 38 (FIG. 2). For example, the distance 104 may range from about 50% of the span 38 to about 95% of the span 38, such as from about 65% of the span 38 to about 95% of the span 38 or from about 75% of the span 38 to about 90% of the span 38 and any other subranges therebetween.

Still referring to FIG. 3, to install the blade sock 100 onto the rotor blade 22, one or more lift cables 106 may be secured to the blade sock 100 and may extend upward to an up-tower location, such as at a location on and/or within the hub 20 or the nacelle 16. For instance, in one embodiment, the lift cable(s) 106 may extend upward from the blade sock 100 to personnel located within and/or on top of the hub 20 or the nacelle 16. Regardless, the lift cable(s) 106 may be used to lift the blade sock 100 vertically upwards relative to the support surface 14 to allow the sock 100 to be installed around the rotor blade 22 at the intermediate location 102. For instance, the blade sock 100 may define a closed shape configured to extend around the outer perimeter of the rotor blade 22. Thus, when lifting the blade sock 100 via the lift cable(s) 106, the sock 100 may be carefully aligned with the rotor blade 22 such that the blade tip 26 is received within the sock 100.

It should be understood by those of ordinary skill in the art that the system and method as described herein can operate without the use of the blade sock 100. In such an embodiment, the cables and/or guide cables as described herein may be attached directly to the rotor blade 22.

Referring now to FIG. 4, the rotor blade 22 may be initially lowered from the hub 22 by an initial vertical distance 146. As will be described below, such initial lowering of the rotor blade 22 may allow for one or more up-tower pulleys 180, 182 to be coupled between the blade 22 and another up-tower component of the wind turbine 10, thereby providing a means for further lowering the rotor blade 22 in the direction of the support surface 14 according to the present disclosure. Thus, the initial vertical distance 146 may generally correspond to any suitable distance that allows for the installation of the pulley(s) and any associated pulley cable(s) or pulley cable(s). For example, in one embodiment, the initial vertical distance 146 may generally range from about 2 feet to about 15 feet, such as from about 3 feet to about 10 feet or from about 5 feet to about 10 feet and any other subranges therebetween.

Referring now to FIGS. 5-7, one embodiment of suitable components that may be included within a lowering system to initially lower the rotor blade 22 from the hub 20 is illustrated in accordance with aspects of the present subject matter. Specifically, FIG. 5 illustrates a partial perspective view of the hub 20, the rotor blade 22 and the pitch bearing 150 of the wind turbine 10 after the blade 22 has been lowered from the hub 20 by the initial vertical distance 146. FIG. 6 illustrates a partial, cross-sectional view of the interface between the rotor blade 22 and the pitch bearing 150 prior to the blade 22 being lowered relative to the hub 20. Additionally, FIG. 7 illustrates a top view of the pitch bearing 150 of the wind turbine 10, particularly illustrating the relative circumferential positioning of the system components utilized to initially lower the rotor blade 22 relative to the hub 20.

It should be appreciated that, for purposes of illustration, only the inner race of the pitch bearing 150 is shown in FIG. 7. As is generally understood, the pitch bearing 150 may also include an outer race configured to be coupled to the hub 20. As such, when the inner race is rotated relative to the outer race of the pitch bearing 150, the rotor blade 22 may be pitched about its pitch axis.

As particularly shown in FIGS. 5 and 6, to allow the rotor blade 22 to be initially lowered, several of the root bolts 46 extending through the bolt holes 151 defined in the pitch bearing 150 may be removed and replaced with suitable support cables 152. For example, as shown in FIG. 5, in one embodiment, eight of the root bolts 46 have been removed and replaced with corresponding support cables 152. In doing so, the remainder of the root bolts 46 may be initially maintained in engagement with the pitch bearing 150 (e.g., via suitable attachment nuts (not shown)) to allow the rotor blade 22 to continue to be supported by the hub 20 until the rotor blade 22 is ready to be lowered.

In general, the support cables 152 may correspond to any suitable cables that are capable of supporting the weight of the rotor blade 22 as it is being lowered relative to the hub 20. For example, in several embodiments, each support cable 152 may correspond to a steel cable or any other suitable wire rope that has a rated load capacity sufficient to handle the weight of the rotor blade 22. In another embodiment, each support cable 152 may correspond to a metal chain or any other suitable elongated cable-like object. Moreover, it should be appreciated that each support cable 152 may generally be configured to define any suitable length that permits the cables to be utilized to lower the rotor blade 22 away from the hub 20 by the initial vertical distance 146.

In addition, the support cables 152 may generally be configured to be coupled to the rotor blade 22 using any suitable attachment means. For example, as shown in the illustrated embodiment, a stud end 154 (FIG. 6) of each cable 152 may be coupled to a threaded cable stud 156 configured to be screwed into one of the barrel nuts 44 extending within the blade root 24. In such an embodiment, a swaged or other suitable connection may be formed between the root end 154 of each cable 152 and each cable stud 156 to securely couple to the cables 152 to the corresponding studs 156. In other embodiments, the support cables 152 may be coupled to the blade root 24 using any other suitable means, such as by coupling each support cable 152 to a suitable mounting fixture configured to be secured to the blade root 24.

It should be appreciated that, in embodiments in which the support cables 152 are coupled to the blade root 24 via the threaded cable studs 156, each cable stud 156 may generally be configured to define any suitable length 157. As shown in FIG. 6, in one embodiment, the length 157 of each cable stud 156 may be substantially equal to a corresponding length 159 of the root bolts 46. Alternatively, as shown in the embodiment of FIG. 8, the length 157 of each cable stud 156 may be less than the length 159 of the root bolts 46.

As shown in FIGS. 5 and 6, each support cable 152 may be configured to be in operative association with a suitable cable translation device 158 positioned within the hub 20. In general, each cable translation device 158 may correspond to any suitable device that allows for the rotor blade 22 to be safely and securely moved relative to the hub 20 using the support cables 152. For example, in several embodiments, each cable translation device 152 may correspond to a fluid-driven actuator (e.g., a hydraulic or pneumatic actuator) configured to be in operative association with a corresponding support cable 152 to allow the rotor blade 22 to be lowered and/or raised relative to the hub 20.

Specifically, in a particular embodiment of the present subject matter, each cable translation device 158 may be configured as a hollow lifting/lowering cylinder or as a single strand jack designed to incrementally lower and/or raise the rotor blade 22. For example, as shown in FIG. 6, each device 158 may include a cylinder 160 configured to be coupled to the pitch bearing 150 (e.g., via suitable bolts and/or other mechanical fasteners (not shown)) and a hollow piston 162 configured to receive one of the support cables 152. The piston 162 may generally be configured to be actuated and retracted relative to the cylinder 160 by supplying/expelling a pressurized fluid to/from the cylinder 160 (e.g., via fluid port 164). In addition, each cable translation device 158 may include an upper clamping mechanism 166 positioned directly above the piston 162 and a lower clamping mechanism 168 positioned directly below the piston 162. As is generally understood, the upper and lower clamping mechanisms 166, 168 may be configured to alternatively clamp the support cable 152 as the piston 162 is actuated and retracted, thereby allowing each translation device 152 to lower or raise the rotor blade 22 in short increments with each actuation/retraction of the piston 162.

Additionally, in several embodiments, a stop block 170 may be configured to be installed around each support cable 152 directly above its corresponding cable translation device 158. In general, each stop block 170 may be configured to serve as a built-in safety feature providing a mechanical stop for each support cable 152 in the event of failure of one of the cable translation devices 158. For example, as particularly shown in FIG. 6, each support cable 152 may include a plurality of lugs 172 spaced apart incrementally along the cable's length. In such an embodiment, an opening or slot (not shown) may be defined through each stop block 170 that is dimensionally larger than the cable 152, thereby allowing the cable 152 to pass through the stop block 170 as it is being lowered relative to the translation device 158. However, given their increased size, the lugs 172 may not be capable of passing through the opening or slot defined in each stop block 170. Accordingly, in the event of failure of one of the cable translation devices 158, the lug 172 positioned immediately above the corresponding stop block 170 may come into contact with and engage an upper surface of the block 170, thereby preventing further motion of the support cable 152 relative to the translation device 158. In contrast, during normal operation, the stop blocks 170 may be continuously repositioned along the support cable 152 as each lug 172 is lowered down onto and/or adjacent to its corresponding stop block 170. For example, as indicated by the dashed lines in FIG. 6, when one of the lugs 172 is lowered down into and/or adjacent to one of the stop blocks 170, the stop block 170 may be removed from the support cable 152 and repositioned above such lug 172 to allow the support cable 152 to continue to be lowered through the translation device 158.

It should be appreciated that, in general, each support cable 152 and corresponding translation device 158 may be configured to be installed at any suitable location around the circumference of the blade root 24 and pitch bearing 150. However, in several embodiments, the cables/devices 152, 158 may be grouped in pairs spaced apart around the blade root 24 and pitch bearing 150. For example, as shown in FIG. 7, in one embodiment, each pair of the cable translation devices 158 may be configured to be positioned around the pitch bearing 150 at circumferential locations generally adjacent to a reference line 174 oriented perpendicularly to a tower reference line 176 extending radially from the center of the wind turbine's tower 12 through the center of the pitch bearing 150. Specifically, as shown, each pair of the cable translation devices 158 may generally be spaced apart circumferentially from the reference line 174 by an angle 178 equal to less than about 45 degrees, such as less than about 40 degrees or less than about 35 degrees. Of course, in such an embodiment, the support cables 152 may similarly be secured to the blade root 24 at a corresponding circumferential location relative to the reference line 174. Such positioning of the cables/devices 152, 158 adjacent to the reference line 174 may, in certain rotor blade configurations, allow for the rotor blade 22 to be slightly angled away from the tower 12 as the blade 22 is being lowered relative to the hub 20 due to the location of the blade's center of gravity.

As indicated above, in one embodiment, eight support cables 152 and corresponding translation devices 158 may be installed to assist in lowering the rotor blade 22 relative to the hub 20. However, in other embodiments, any other suitable number of support cables 152 and translation devices 158 may be utilized to lower the rotor blade 22 relative to the hub 20. For instance, in one embodiment, the rotor blade 22 may be lowered using only four cables/devices 152, 158 or using only two cables/devices 152, 158.

Additionally, in other embodiments, only a portion of the support cables 152 coupled to the rotor blade 22 may be configured to be in operative association with corresponding cable translation devices 158. For instance, FIG. 8 illustrates an alternative embodiment to the embodiment shown in FIG. 6. As shown in FIG. 8, for each pair of support cables 152 extending from the blade root 24, one of the cables 152 may be configured to be in operative association with a corresponding translation device 158 positioned within the hub 20. In such an embodiment, each support cable 152 not associated with a translation device 158 may simply be used to provide additional support for the rotor blade 22 as it is being lowered. In addition, such support cables 152 may also be configured to be utilized in connection with the stop blocks 170 described above. For instance, as shown in FIG. 8, the stop block 170 may be positioned directly above the pitch bearing 150 to allow the stop block 170 to be engaged between one of the cable lugs 172 and the pitch bearing 150 in the event of failure of one or more of the translation devices 158 installed on any of the other support cables 152.

It should be appreciated that, in further embodiments of the present subject matter, the rotor blade 22 may be configured to be initially lowered from the hub 20 using any other suitable lowering means known in the art. For instance, as an alternative to the fluid-driven cable translation devices 158 described above, the cable translation devices may correspond to winches positioned within the hub 20. In such an embodiment, the support cables 152 may be unwound from each associated winch in order to initially lower the rotor blade 22 from the hub 20. In another embodiment, the support cables 152 may be replaced with elongated threaded rods. In such an embodiment, the threaded rods may be received within a suitable translation device (e.g., a screw jack) configured to allow the rods to be moved relative to the device, thereby allowing the rotor blade 22 to be lowered relative to the hub 20.

Referring now to FIGS. 9-11, another embodiment of suitable components that may be included within a lowering system to initially lower the rotor blade 22 from the hub 20 an initial vertical distance 146 is illustrated in accordance with aspects of the present subject matter. Specifically, FIG. 9 illustrates a partial perspective view of the hub 20, the rotor blade 22 and the pitch bearing 150 of the wind turbine 10 after the blade 22 has been lowered from the hub 20 by the initial vertical distance 146. FIG. 10 illustrates a partial, perspective view of the interior of the hub 20 at the interface between the rotor blade 22 and the pitch bearing 150 prior to the blade 22 being lowered relative to the hub 20. Additionally, FIG. 11 illustrates a perspective view of one embodiment of a modified barrel-type support nut 300 configured for use in the illustrated lowered system in accordance with aspects of the present subject matter.

As particularly shown in FIGS. 9 and 10, to allow the rotor blade 22 to be initially lowered, several of the root bolts 46 extending through the bolt holes 151 defined in the pitch bearing 150 may be removed. The existing barrel nuts 44 associated with such bolts 46 may then be replaced with cylindrically-shaped support nuts 300, with each support nut 300 being configured to allow a corresponding support cable 302 to be coupled to the blade root 24. For example, as shown in FIG. 9, in one embodiment, four of the existing barrel nuts 44 may be removed and replaced with suitable support nuts 300. In doing so, the remainder of the root bolts 46 may be initially maintained in engagement with the pitch bearing 150 (e.g., via suitable attachment nuts 304 (FIG. 10) to allow the rotor blade 22 to continue to be supported by the hub 20 until the rotor blade 22 is ready to be lowered.

It should be appreciated that the support nuts 300 may generally have any suitable configuration that allows each support nut 300 to be inserted through the blade root 24 in place of one of the existing barrel nuts 44 as well as to provide a means for coupling each support cable 302 to the rotor blade 22. For example, in one embodiment, each support nut 300 may be configured as a modified barrel nut. For instance, as shown in FIG. 11, each support nut 300 may include a threaded opening 306 extending vertically through the support nut 300 to allow a corresponding root bolt 46 or other suitable threaded member to be coupled to the nut 300 and extend vertically therefrom. In addition, each support nut 300 may include a laterally extending threaded opening 308 defined through one of the sides of the nut 300. As shown in FIG. 11, such opening 308 may allow for a suitable coupling device 310 (e.g., a swivel eye, mount ring, mount hook or any other suitable attachment mechanism) to be secured to the support nut 300 for coupling each support cable 302 to the rotor blade 22.

As indicated above, in one embodiment, four support nuts 300 may be installed through the blade root 24 in place of the existing barrel nuts 44 to allow four corresponding support cables 302 to be coupled to the rotor blade 22. However, in other embodiments, any other suitable number of support nuts 300 may be secured within the blade root 24 to provide a means for coupling a corresponding number of support cables 302 to the rotor blade 22, such as by installing less than four support nuts 300 within the blade root 24 (e.g., two or three support nuts) or greater than four support nuts 300 within the blade root 24 (e.g., five, six or more support nuts).

Additionally, it should be appreciated that the support nuts 300 may be configured to be maintained in position relative to the rotor blade 22 using any suitable attachment means. For instance, in one embodiment, once a given support nut 300 is inserted within the blade root 24, a corresponding root bolt 46 may be inserted through the pitch bearing 150 and screwed into the vertically extending opening 306 of the support nut 300 in order to secure the nut 300 within the blade root 24. Alternatively, as shown in FIG. 10, an alignment pin 312 may be configured to be inserted through the pitch bearing 150 and screwed into the vertically extending opening 306 of each support nut 300. In such an embodiment, each alignment pin 312 may generally be configured for attachment within the corresponding support nut 300 in a manner similar to the existing root bolts 46 and, thus, may include a threaded end 314 for engaging the threaded opening 306 of the support nut 300. However, as shown in FIG. 10, each alignment pin 312 may define a vertical height or length 316 that is greater than the length 159 (FIG. 6) of the root bolts 46. Accordingly, the alignment pins 312 may also be utilized to align the rotor blade with pitch bearing as the rotor blade (or a different rotor blade with the alignment pins installed therein) is being lifted up onto the hub.

In a further embodiment, the support nuts 300 may be secured within the blade root 24 using the threaded cable studs 156 of the support cables 152 described above with reference to FIGS. 5-8. In such an embodiment, the support cables 152 may be utilized as additional safety features for the system as the rotor blade 22 is being lowered relative to the hub 20. For example, as described above with reference to FIG. 8, the disclosed stop blocks 170 may be utilized without the cable translation devices 158 to allow each block 170 to serve as a mechanical stop between the pitch bearing 150 and the adjacent lugs 172 of the support cables 152 as the rotor blade 22 is being lowered.

It should also be appreciated that each support nut 300 may generally be configured to be installed within the rotor blade 22 at any suitable circumferential location around the blade root 24. However, in several embodiments, the support nuts 300 may be configured to be installed at the same or similar locations to the circumferential locations for the cables/devices 152/158 described above with reference to FIG. 7. For instance, in one embodiment, the support nuts 300 may be configured to be installed within the blade root 24 at circumferential locations spaced apart from the reference line 174 by a given angle 178 (FIG. 7), wherein the angle is generally equal to less than about 45 degrees.

Referring particularly to FIGS. 9 and 10, in several embodiments, each support cable 302 may be configured to extend from one of the support nuts 300 to a corresponding cable translation device 318 positioned within the hub 20. As shown in FIG. 10, in one embodiment, the cable translation device 318 may correspond to cable hoists (including chain hoists) configured to be mounted to and/or supported by any suitable wind turbine component(s) positioned within the hub 20 (e.g., the hub gusset(s), joist(s) and/or any other suitable component(s)). As is generally understood, cable hoists may be configured to allow suitable cables to be passed therethrough in a controlled manner. Thus, in the present application, such cable hoists may be utilized to safely and effectively lower the rotor blade 22 relative to the hub 20.

It should be appreciated that, in alternative embodiments, the cable translation devices 318 may correspond to any other suitable devices and/or mechanisms that allow for the rotor blade 22 to be lowered relative to the hub 20 via the corresponding support cables 302. For instance, in another embodiment, the cable translation devices 318 may correspond to winches positioned within the hub 20.

It should also be appreciated that, similar to the support cables 152 described above, each support cable 302 may generally correspond to any suitable elongated cable-like object that has a rated load capacity sufficient to handle the weight of the rotor blade 22. For instance, as shown in the illustrated embodiment, the support cables 302 are configured as metal chains. However, in other embodiments, the support cables 302 may correspond to steel cables or any other suitable wire ropes. Moreover, it should be appreciated that each support cable 302 may generally be configured to define any suitable length that permits the cables 302 to be utilized to lower the rotor blade 22 away from the hub 20 by the initial vertical distance 146.

Referring now to FIG. 12, after lowering the rotor blade 22 from the hub 20 by the initial distance 146 (FIG. 4), one or more up-tower pulleys 180, 182 may be used to couple one or more pulley cables or cables 116 between the rotor blade 22 and a main or first ground winch 112 supported on and/or adjacent to the support surface 14. For example, as shown in FIG. 12, the pulley cable 116 may be configured to be operatively coupled around one or more up-tower pulleys 180, 182 coupled to the rotor blade 22 and/or to one or more up-tower components of the wind turbine 10 (e.g., the rotor 18 or the pitch bearing 150). By coupling the pulley cable 116 between the first winch 112 and the rotor blade 22 via the pulleys 180, 182, the pulley cable 116 may be slowly unwound or otherwise released from the winch 112, thereby allowing the rotor blade 22 to lowered from the hub 20 in a controlled manner.

It should be appreciated that, as the rotor blade 22 is being lowered using the pulley cable 116, the system and method of the present disclosure also utilizes a guide line 108 configured to control the orientation of the rotor blade 22 as the blade 22 is being lowered. Specifically, as shown in FIG. 12, by securing the rotor blade 22 to the guide line 108 via a guide cable 120 over guide pulley 118, the rotor blade 22 may be maintained a safe distance away from the tower 12. In addition, the guide line 108, in combination with the guide cable 120 and the guide pulley 118, may also be utilized to rotate the rotor blade 22 into a generally horizontal position prior to lowering the blade 22 onto and/or directly adjacent to support surface 14, which is described in more detail in regards to FIGS. 18 and 19.

Referring now to FIGS. 13-16, various examples of different up-tower pulley arrangements are illustrated in accordance with aspects of the present subject matter. Specifically, in each example shown in FIGS. 13-16, one or more pulleys 180 are coupled to the pitch bearing 150 and one or more pulleys 182 are coupled to the rotor blade 22. However, in other embodiments, the pulley(s) 180 may be configured to be coupled to any other suitable up-tower component(s) of the wind turbine 10 in addition to the pitch bearing 150. For instance, as an alternative to coupling the up-tower pulley(s) 180 to the pitch bearing 150, such pulley(s) 180 may be coupled to the hub 20 (e.g., by coupling the pulley(s) 180 within the interior of the hub 20), the nacelle 16 or any other suitable up-tower component of the wind turbine 10.

As shown in FIG. 13, in one embodiment, a single pulley 180 may be coupled to the pitch bearing 150 and pulleys 182A, 182B may be coupled to the blade root 24 of the rotor blade 22. In such an embodiment, pulley 180 may, for example, be vertically aligned with one of the pulleys 182A, 182B (e.g., pulley 180A) on a first side of the blade/bearing 22, 150, with the other pulley (e.g., pulley 182B) being positioned on an opposite of the blade 22. Additionally, as shown in FIG. 13, a pulley cable 116 may be coupled to the pitch bearing 150 (or the hub 20) at an attachment location 192 such that the cable 116 may be operatively coupled around the pulleys 180, 182A, 182B as the line 116 extends between the attachment location 192 and the first winch 112 (FIG. 12) positioned on and/or adjacent to the support surface 14 of the wind turbine 10. Thus, as the lifting cable 116 is unwound from or otherwise released by the first winch 112, the cable 116 may follow a path (as indicated by arrows 194) extending from pulley 180 around pulley 182A and then around the pulley 182B as the rotor blade 22 is lowered.

In another embodiment, as shown in FIG. 14, up-tower pulleys 180A, 180B may be coupled to the pitch bearing 150 and pulleys 182A, 182B may be coupled to the blade root 24 of the rotor blade 22. In such an embodiment, pulley 180A may, for example, be vertically aligned with one of the pulleys 182A, 182B (e.g., pulley 182A) on a first side of the blade/bearing 22, 150, with the other pulley 182B being positioned on an opposite of the blade 22. Additionally, pulley 180B may be positioned at a location defined horizontally between pulleys 182A and 182B. Moreover, as shown in FIG. 14, a lifting cable 116 may be coupled to the pitch bearing 150 (or the hub 20) at an attachment location 192 such that the cable 116 may be operatively coupled around the up-tower pulleys 180A, 180B, 182A, 182B as the cable 116 extends between the attachment location 192 and the first winch 112 (FIG. 12) positioned on and/or adjacent to the support surface 14 of the wind turbine 10. Thus, as the pulley cable 116 is unwound from or otherwise released by the winch 112, the cable 116 may follow a path (as indicated by arrows 194) from pulley 180A around pulley 182A and then from pulley 180B around pulley 182B as the rotor blade 22 is being lowered.

In a further embodiment, as shown in FIG. 15, up-tower pulleys 180A, 180B may be coupled to the pitch bearing 150 and pulleys 182A, 182B may be coupled to the blade root 24 of the rotor blade 22. However, unlike the example shown in FIG. 14, pulley 180A may be vertically aligned with one of the pulleys (e.g., the first blade pulley 182A) on a first side of the blade/bearing 22, 150 and pulley 180B may be vertically aligned with pulley 182B on an opposite of the blade/bearing 22, 150. Additionally, as shown in FIG. 15, a lifting cable 116 may be coupled to the blade root 24 at an attachment location 192 such that the cable 116 may be operatively coupled around the pulleys 180A, 180B, 182A, 182B as the cable 116 extends between the attachment location 192 and the first winch 112 (FIG. 12) positioned on and/or adjacent to the support surface 14 of the wind turbine 10. Thus, as the pulley cable 116 is unwound from or otherwise released by the winch 112, the cable 116 may follow a path (as indicated by arrows 194) extending from pulley 180A around pulley 182A and then from pulley 180B around pulley 182B as the rotor blade 22 is being lowered.

As yet another example, as shown in FIG. 16, up-tower pulley 180 may be coupled to the pitch bearing 150 and up-tower pulley 182 may be coupled to the blade root 24 of the rotor blade 22. In such an embodiment, one or both of the pulleys 180, 182 may correspond to a double pulley. For instance, as shown in FIG. 16, pulley 180 is configured as a double pulley and, thus, includes double pulley slots 195 and 196 for receiving a cable. Additionally, as shown in FIG. 16, a lifting cable 116 may be coupled to the blade root 24 at an attachment location 192 such that the cable 186 may be operatively coupled around the pulleys 180, 182 as it extends between the attachment location 192 and the first winch 112 (FIG. 12) positioned on and/or adjacent to the support surface 14 of the wind turbine 10. Thus, as the lifting cable 116 is unwound from or otherwise released by the winch 112, the cable 116 may follow a path (as indicated by arrows 194) extending from pulley slot 195 of pulley 180 around pulley 182 and then back around pulley slot 196 of pulley 180.

Referring now to FIG. 17, yet another embodiment of a suitable pulley arrangement is illustrated in accordance with aspects of the present subject matter. As shown in FIG. 17, up-tower pulleys 180A, 180B may be supported adjacent to the hub 20 by corresponding support straps 214 extending around the remaining "rabbit-eared" rotor blades 22. Specifically, up-tower pulley 180A may be supported by a first support strap 214 extending around one of the remaining rotor blades 22 and up-tower pulley 180B may be supported by a second support strap 216 extending around the other remaining rotor blade 22. In such an embodiment, pulleys cables 116A, 116B may be configured to be coupled between the rotor blade 22 and the first winch(es) 112 supported on and/or adjacent to the support surface 14. Thus, as the pulley cables 116A, 116B are unwound from or otherwise released by the winch(es) 112, each cable 116A, 116B may extend up to and around its corresponding up-tower pulley 180A, 180B (as indicated by arrows 194) to allow the rotor blade 22 to be lowered relative to the hub 20 in a controlled manner.

Referring to FIGS. 12, 18, and 19, a guide line 108 attached from a second ground winch 114 to an up-tower location of the wind turbine 10, e.g. the rotor 18, and controls an orientation of the rotor blade 22 as it is being lowered to the support surface 14. More particularly, the guide line 108 includes a guide pulley 118 mounted thereto and a corresponding guide cable 120 configured over the guide pulley 118 and attached to the rotor blade 22. Thus, the guide pulley 118 is configured to move along the guide line 108 during raising and/or lifting of the rotor blade 22 such that the guide pulley 118 can move with the rotor blade 22 and the guide cable 120 can maintain contact with the rotor blade 22.

The guide line 108 may be attached to the up-tower location of the wind turbine 10 using any suitable means. For example, in one embodiment, the guide line 108 may have a stud end (similar to the support cables of FIG. 5) that may be coupled to a threaded cable stud configured to be screwed into a corresponding nut extending within the up-tower location of the wind turbine 10. In other embodiments, the guide line 108 may be coupled to the up-tower location of the wind turbine 10 using any other suitable means, such as by coupling the guide line 108 to a suitable mounting fixture configured to be secured to the up-tower location of the wind turbine 10.

In certain embodiments, the guide line 108 may correspond to a steel cable or any other suitable wire rope that has a rated load capacity sufficient to support at least a portion of the weight of the rotor blade 22. Thus, the guide line 108 is configured to control the orientation of the rotor blade 22 as it is being raised or lowered. Further, it should be understood that the guide cable 120 may be attached to the rotor blade 22 using any suitable means. For example, in certain embodiments, the guide cable 120 may be attached to the optional blade sock 100 (as shown) or may be attached to the rotor blade 22 directly, e.g. by being wrapped around the blade tip 26.

Referring particularly to FIGS. 18 and 19, upon installation of one or more pulleys 180, 182, the rotor blade 22 may be lowered down onto and/or adjacent to the support surface 14 using the associated pulley cables 116 and guide line 108. In doing so, the guide line 108, which is coupled to the rotor blade 22 via guide pulley 118 and guide cable 120) may be used to control the orientation of the rotor blade 22 as the blade 22 is lowered from the hub 20. For example, as indicated above, as the rotor blade 22 begins to be lowered in the direction of the support surface 14 via the pulley cables 116, the pulley block 118 is configured to move along the guide line 108 to control the orientation of the rotor blade 22 relative to the tower 12. More specifically, the guide line 118 can be controlled (e.g., via a secondary winch 114) in a manner that prevents the rotor blade 22 from contacting the wind turbine tower 12, such as by using the guide line 108 to angle the rotor blade 22 away from the tower 12.

Additionally, as the rotor blade 22 is further lowered towards the support surface 14, the guide line 108 and corresponding guide cable 120 may be utilized to rotate the rotor blade 22 into a generally horizontal position in order to prevent the blade tip 26 from contacting the support surface 14 and to properly orient the rotor blade 22 relative to the support surface 14, as particularly illustrated in FIG. 19. For example, in various embodiments, the rotor blade 22 may be lowered until the blade 22 reaches a predetermined location. In certain embodiments, the predetermined location is determined by a stopping point of the up-tower pulleys 180, 182. More specifically, the stopping point of the up-tower pulleys 180, 182 may be controlled by an additional winch, a controlled pulley cable, an additional pulley, a fixed-length line, or similar. Further, when the rotor blade 22 reaches the predetermined location relative to the support surface 14, the guide line 108 can be designed such that the guide cable 120 has typically reached an end of the guide line 108. In addition, the guide cable 120 defines a predetermined length. Thus, once the rotor blade 22 reaches the predetermined location, the guide cable 120 maintains contact with the blade tip 26, while the first winch 112 continues to lower the blade root 24 such that the rotor blade 22 rotates to a generally horizontal position. For example, as shown in FIG. 19, the rotor blade 22 may be rotated so as to have a horizontal orientation extending generally parallel to the support surface 14. The pulley cable(s) 116 and the guide cable 120 may then be used to lower the rotor blade 22 down onto the support surface 14 or onto suitable blade supports positioned on the support surface 14.

Referring now to FIGS. 20-22, another embodiment of a method for lowering the rotor blade 22 from the rotor 18 to the support surface 14 is illustrated. The embodiment operates similar to the embodiment of FIG. 12, but also includes an additional pulley cable 122 coupled to the rotor 18 and the guide pulley 118 so as to control the location of the guide pulley 118 such that contact between the guide cable 120 and the rotor blade 22 is maintained. Thus, as the rotor blade 22 is lowered, the additional line 122 prevents the guide cable 120 from losing contact with the rotor blade 22 (e.g. by slipping off of the blade tip 26). In addition, the additional pulley cable 122 can control the location of the guide pulley 118 such that the pulley 118 is not overextended past a length of the guide line 108. Further, as shown, the additional pulley cable 122 can have a fixed length or an adjustable length.

Referring now to FIGS. 23-25, still another embodiment of a method for lowering the rotor blade 22 from the rotor 18 to the support surface 14 is illustrated. Similar to the embodiment of FIGS. 20-22, the illustrated embodiment includes an additional pulley cable 126 configured to control the location of the guide pulley 118 so as to maintain contact between the guide cable 120 and the rotor blade 22. In addition, the illustrated embodiment includes a third pulley 134 attached to an attachment point at an up-tower location, e.g. the rotor 18, such that the additional line 126 is attached from a third ground winch 124 over the third pulley 134 to the guide pulley 118 to control a location of the guide pulley 118 along the guide line 108. Thus, as the rotor blade 22 is lowered, the additional line 126 prevents the guide cable 120 from losing contact with the rotor blade 22 (e.g. by slipping off of the blade tip 26). In addition, the additional pulley cable 126 can control the location of the guide pulley 118 such that the pulley 118 is not overextended past a length of the guide line 108. Further, as shown, the additional pulley cable 126 can have a fixed length or an adjustable length.

It should also be appreciated that the present subject matter is also directed to methods for installing a rotor blade 22 onto a wind turbine 10. As indicated above, such installation methods may be performed simply by reversing the various method steps described above for removing a rotor blade 22 from a wind turbine 10. Specifically, the rotor blade 22 to be installed onto the wind turbine 10 may be initially placed on and/or adjacent to the support surface 14 at a location proximal to the wind turbine tower 12. A suitable pulley cable 116 may then be coupled between the rotor blade 22 and a first winch 112 using one or more up-tower pulley(s) 180, 182. In addition, an optional blade sock 100 may be installed onto the rotor blade 22 at an intermediate location 102 on the blade 22. The pulley cable(s) 116 and the guide cable 120 may then be utilized to initially raise the rotor blade 22 away from the support surface 14. Thereafter, as the pulley cable(s) 116 of the first winch 112 is used to further raise the rotor blade 22 (i.e. the blade root 24) towards the hub 20, the guide cable 120 mounted onto the guide line 108 may be used to control the orientation of the rotor blade 22 (i.e. the blade tip 26) relative to the tower 12, such as by using the guide cable 120 to allow the rotor blade 22 to rotate from a generally horizontal position to a generally vertical position.

Once the rotor blade 22 is raised to a location adjacent to the hub 20 (e.g., such that the blade 22 is spaced apart from the hub 20 by the vertical distance 146 (FIG. 9), suitable support cables 152, 302 may be coupled to the rotor blade 22 and corresponding cable translation devices 158 may be installed within the hub 20. Thereafter, the pulleys 180, 182 may be removed to allow the translation devices 158, 318 to be used to raise the rotor blade 22 to a location directly adjacent to the hub 20 such that the root bolts 46 are received within the corresponding bolt holes 151 defined in the pitch bearing 150. The root bolts 46 may then be secured to the pitch bearing 150 (e.g., using suitable attachment nuts) in order complete the installation of the rotor blade 22 onto the hub 20.

Referring now to FIGS. 26 and 27, it should be understood that the first, second, and third winches 112, 114, 124 as described herein may have any suitable location relative to the wind turbine 10 and/or each other. For example, as shown in FIG. 26, the main winch 112 is positioned at a 90-degrees angle with respect to the secondary winch 114 and the tower. In another embodiment, as shown in FIG. 27, the first and second winches 112, 114 are positioned on the same skid or on top of each other. In still additional embodiments, the first and second winches 112, 114 may be positioned at any other suitable location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for removing a rotor blade from atop a tower of a wind turbine, the method comprising:
    positioning the rotor blade being removed in a substantially six o'clock position;
    installing at least one up-tower pulley at an up-tower location of the wind turbine;
    attaching a pulley cable from a first ground winch over the up-tower pulley to the rotor blade;
    attaching a guide line from a second ground winch to an up-tower location of the wind turbine;
    securing a guide pulley to the guide line, wherein the guide pulley is configured to move along the guide line;
    securing a guide cable from the rotor blade to the guide line over the guide pulley and back to the rotor blade so as to control an orientation of the rotor blade relative to the tower as the rotor blade is being lowered;
    allowing the guide pulley and the guide cable to move along the guide line until the guide pulley and the guide cable reach an end of the guide line;
    rotating the rotor blade to a generally horizontal position when the guide pulley and the guide wire are located at the end of the guide line by lowering the blade root of the rotor blade via the pulley cable and the first ground winch; and,
    lowering the rotor blade in the generally horizontal position by coordinated winch operation to a location on or adjacent to a support surface of the wind turbine.

2. The method of claim 1, further comprising lowering the rotor blade an initial vertical distance from a rotor of the wind turbine before attaching the up-tower pulley.

3. The method of claim 2, further comprising attaching a third pulley to an attachment point at the rotor of the wind turbine and attaching an additional pulley cable from a third ground winch over the third pulley to the guide pulley to control a location of the guide pulley along the guide line.

4. The method of claim 1, further comprising lowering the rotor blade by coordinated winch operation until the rotor blade reaches a predetermined location and then rotating the rotor blade to the generally horizontal position.

5. The method of claim 4, wherein the predetermined location is determined by a stopping point of the up-tower pulley, wherein the stopping point of the up-tower pulley is controlled by at least one of the following: an additional winch, a controlled pulley cable, an additional pulley, or a fixed line.

6. The method of claim 1, further comprising attaching an additional pulley cable between an up-tower location of the wind turbine and the guide pulley to control a location of the guide pulley along the guide line, wherein the additional pulley cable comprises a fixed length.

7. The method of claim 1, wherein the step of attaching the guide cable from the guide line over the guide pulley to the rotor blade further comprises attaching the guide cable to a blade tip of the rotor blade.

8. The method of claim 1, further comprising positioning the first and second winches on top of each other.

9. The method of claim 1, further comprising positioning the first and second winches at a 90-degrees angle with respect to each another and the tower.

10. A method for lifting a rotor blade of a wind turbine from a support surface to a rotor, the method comprising:
    attaching a pulley cable from a first ground winch over an up-tower pulley at an up-tower location of the wind turbine to the rotor blade;
    attaching a guide line from a second ground winch to an up-tower location of the wind turbine, wherein the guide line comprises a guide pulley configured thereon at an end of the guide line, the guide pulley configured to move from an initial position at the end of the guide line and then along the guide line as the rotor blade is being lifted;
    securing a guide cable from the rotor blade to the guide line over the guide pulley and back to the rotor blade so as to control an orientation of the rotor blade relative to the tower from an initial horizontal position with the guide pulley at the aid of the guide line towards a generally vertical position as the rotor blade is being lifted; and,
    lifting the rotor blade via the pulley cable by coordinated ground winch operation to the rotor.

11. The method of claim 10, further comprising:
    attaching a third pulley to an up-tower location of the wind turbine; and,
    attaching a pulley cable from a third ground winch over the third pulley to the guide pulley to control a location of the guide pulley along the guide line.

12. The method of claim 10, further comprising attaching a pulley cable between an up-tower location of the wind turbine and the guide pulley to control a location of the guide pulley along the guide line, wherein the third pulley cable comprises a fixed length.

13. The method of claim 10, wherein the step of securing the guide cable from the rotor blade to the guide line over the guide pulley and back to the rotor blade further comprises attaching the guide cable to a blade tip of the rotor blade.

14. The method of claim 10, further comprising positioning the first and second winches on top of each other.

15. The method of claim 10, further comprising positioning the first and second winches at a 90-degrees angle with respect to each another and the tower.

16. A system for lifting and removing a rotor blade of a wind turbine to and from a rotor installed atop a wind turbine tower, the system comprising:
- at least one up-tower pulley mounted on an up-tower location of the wind turbine;
- a first ground winch and a second ground winch disposed at a location at or adjacent to a support surface of the tower;
- a pulley cable extending from the first ground winch over the up-tower pulley and secured to the rotor blade;
- a guide line secured between the second ground winch and an up-tower location of the wind turbine;
- a guide pulley mounted on an end of the guide line, wherein the guide pulley is configured to move along the guide line during lifting and removing of the rotor blade; and,
- a guide cable extending from the rotor blade to the guide line over the guide pulley and directly back to the rotor blade so as to control an orientation of the rotor blade relative to the tower during lifting and removing of the rotor blade, such that when the guide pulley is at the end of the guide line, the rotor blade is rotated to or from a generally horizontal position as the pulley cable is lowered or raised by the first round winch.

17. The system of claim 16, further comprising:
- a third pulley attached to an up-tower location of the wind turbine; and,
- a pulley cable from a third ground winch over the third pulley to the guide pulley to control a location of the guide pulley along the guide line.

18. The system of claim 16, further comprising a pulley cable extending between an up-tower location of the wind turbine and the guide pulley to control a location of the guide pulley along the guide line.

* * * * *